United States Patent
Inaba et al.

(10) Patent No.: US 8,383,245 B2
(45) Date of Patent: Feb. 26, 2013

(54) GAS BARRIER MULTILAYER STRUCTURE PRECURSOR, GAS BARRIER MULTILAYER STRUCTURE AND PROCESSES FOR PRODUCING THE SAME

(75) Inventors: Yusaku Inaba, Omitama (JP); Chisato Fujimura, Omitama (JP); Yuka Noguchi, Ishioka (JP); Katsumi Kawaguchi, Omitama (JP)

(73) Assignee: Toppan Printing Co., Ltd., Tokyo (JP)

( * ) Notice: Subject to any disclaimer, the term of this patent is extended or adjusted under 35 U.S.C. 154(b) by 609 days.

(21) Appl. No.: 12/451,718

(22) PCT Filed: May 22, 2008

(86) PCT No.: PCT/JP2008/059458
§ 371 (c)(1),
(2), (4) Date: Nov. 24, 2009

(87) PCT Pub. No.: WO2008/146706
PCT Pub. Date: Dec. 4, 2008

(65) Prior Publication Data
US 2010/0136350 A1 Jun. 3, 2010

(30) Foreign Application Priority Data
May 29, 2007 (JP) ................. 2007-141873

(51) Int. Cl.
B32B 27/00 (2006.01)
B32B 9/00 (2006.01)
B05D 3/02 (2006.01)

(52) U.S. Cl. .............. 428/500; 428/689; 427/372.2

(58) Field of Classification Search .............. None
See application file for complete search history.

(56) References Cited

U.S. PATENT DOCUMENTS
7,476,712 B2  1/2009  Tanaka et al.
2005/0131162 A1*  6/2005  Tanaka et al. .............. 525/329.7
2007/0111005 A1  5/2007  Oshita et al.
2009/0214854 A1*  8/2009  Okawara et al. .............. 428/323

FOREIGN PATENT DOCUMENTS
| JP | 2004-322338 | 11/2004 |
| JP | 2006-256091 | 9/2006 |
| JP | 2007-008584 | 1/2007 |
| WO | WO 03/091317 A1 | 11/2003 |
| WO | WO 2005/053954 A1 | 6/2005 |

* cited by examiner

Primary Examiner — Sheeba Ahmed
(74) Attorney, Agent, or Firm — The Webb Law Firm

(57) ABSTRACT

Gas barrier multilayer structure precursors are not clouded even when exposed to cold water and have excellent abuse resistance. Gas barrier multilayer structures are obtained from the gas barrier multilayer structure precursors.

A gas barrier multilayer structure precursor includes a support and a gas barrier layer precursor formed on the support, the gas barrier layer precursor including a layer (A) and a layer (B), the layer (A) including a polycarboxylic acid polymer and a silicon-containing compound (i) derived from a silane coupling agent represented by Formula (1) below, the weight ratio of the polycarboxylic acid polymer and the silicon-containing compound (i) being in the range of 99.5:0.5 to 80.0:20.0, the layer (B) including a polyvalent metal compound, the layer (A) analyzed by a transmission method showing an infrared absorption spectrum in which the maximum peak height ($\alpha$) in the range of 1490 to 1659 cm$^{-1}$ and the maximum peak height ($\beta$) in the range of 1660 to 1750 cm$^{-1}$ have a ratio ($\alpha/\beta$) of less than 1. A gas barrier multilayer structure is obtained by subjecting the gas barrier multilayer structure precursor to retort treatment, boil treatment or humidity conditioning treatment.

$$Si(OR)_3Z \qquad (1)$$

7 Claims, No Drawings ably exp
GAS BARRIER MULTILAYER STRUCTURE PRECURSOR, GAS BARRIER MULTILAYER STRUCTURE AND PROCESSES FOR PRODUCING THE SAME This application is the United States national stage of International Application No. PCT/JP2008/059458, filed May 22, 2008, which was published under PCT Article 21 as International Publication No. WO 2008/146706A1, and which claims benefit of Japanese Patent Application No. 141873/2007 filed May 29, 2007 and the text of application 141873/2007 is incorporated by reference in its entirety herewith.

FIELD OF THE INVENTION

The present invention relates to gas barrier multilayer structure precursors, gas barrier multilayer structures, and processes for producing the precursors or multilayer structures.

BACKGROUND OF THE INVENTION

For conventional gas barrier polymers, such as poly(meth)acrylic acid and polyvinyl alcohol which have a highly hydrogen bonding group with high hydrophilicity have been used. Films of these polymers show very high gas barrier properties against oxygen or the like under dry conditions. Under high humidity conditions, however, the gas barrier properties against oxygen or the like are drastically lowered and the films are poor in resistance to moisture or hot water because of the hydrophilicity.

To solve these problems, Patent Document 1 discloses that a polycarboxylic acid polymer layer and a polyvalent metal compound-containing layer are laminated adjacent to each other on a support film, and a polyvalent metal salt of polycarboxylic acid polymer is formed by interlayer reaction. The gas barrier films thus produced are shown to have high oxygen barrier properties even under high humidity.

However, the gas barrier films of Patent Document 1 reduce gas barrier properties or are clouded when exposed to cold water.

Some gas barrier multilayer structures show high gas barrier properties irrespective of humidity or even after retort treated. Patent Document 2 discloses gas barrier multilayer structures that have a layer containing a polycarboxylic acid at least partially neutralized with a divalent or higher polyvalent metal, and a hydrolyzed condensate of a compound which contains a metal atom bonded with at least one characteristic group selected from halogen atoms and alkoxyl groups.

However, the gas barrier multilayer structures disclosed in Patent Document 2 show poor gas barrier properties if they have undergone abuses such as stretching during the production. Handling properties of the multilayer structures are accordingly low.
[Patent Document 1: WO 03/091317]
[Patent Document 2: WO 05/053954]

DISCLOSURE OF THE INVENTION

The present invention has been made in view of the above problems in the art. It is therefore an object of the invention to provide gas barrier multilayer structure precursors that are not clouded even when exposed to cold water and have excellent abuse resistance. It is another object to provide gas barrier multilayer structures excellent in gas barrier properties that are obtained from the gas barrier multilayer structure precursors, and processes for producing the precursors or multilayer structures.

The present inventors diligently studied to achieve the above objects and have found that a gas barrier multilayer structure precursor having a specific gas barrier layer precursor as described below is not clouded even when exposed to cold water and, even if the multilayer structure precursor is abused such as by stretching, it can give a gas barrier multilayer structure with excellent gas barrier properties through at least one treatment selected from the group consisting of retort treatment, boil treatment and humidity conditioning treatment after the abusing. The present invention has been completed based on the finding.

A gas barrier multilayer structure precursor according to the present invention comprises a support and a gas barrier layer precursor formed on the support, the gas barrier layer precursor comprising a layer (A) and a layer (B), the layer (A) comprising a polycarboxylic acid polymer and at least one silicon-containing compound (i) selected from the group consisting of silane coupling agents represented by Formula (1) below, hydrolysates thereof and condensates of these compounds, the weight ratio of the polycarboxylic acid polymer and the silicon-containing compound(s) (i) in the layer (A) (the weight of the silicon compounds (i) other than the silane coupling agents is in terms of silane coupling agents) being in the range of 99.5:0.5 to 80.0:20.0, the layer (B) comprising a polyvalent metal compound, the layer (A) isolated from the support and the layer (B) and analyzed by a transmission method showing an infrared absorption spectrum in which the maximum peak height (α) in the range of 1490 to 1659 cm$^{-1}$ and the maximum peak height (β) in the range of 1660 to 1750 cm$^{-1}$ have a ratio (α/β) of less than 1;

$$\mathrm{Si(OR)_3Z} \tag{1}$$

wherein R is a C1-6 alkyl group, Z is an organic group containing a glycidyloxy or amino group, and a plurality of R may be the same or different from one another.

In one embodiment, a gas barrier multilayer structure precursor according to the present invention comprises a support and a gas barrier layer precursor formed on the support, the gas barrier layer precursor comprising a layer (A) and a layer (B) that are obtained by applying a coating liquid (a) on the support and drying the coating to form the layer (A) and thereafter applying a coating liquid (b) and drying the coating to form the layer (B), the coating liquid (a) comprising a polycarboxylic acid polymer and at least one silicon-containing compound (i) selected from the group consisting of one or more silane coupling agents represented by Formula (1) above, hydrolysates thereof and condensates of these compounds, the coating liquid (b) comprising a polyvalent metal compound, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0, the layer (A) isolated from the support and the layer (B) and analyzed by a transmission method showing an infrared absorption spectrum in which the maximum peak height (α) in the range of 1490 to 1659 cm$^{-1}$ and the maximum peak height (β) in the range of 1660 to 1750 cm$^{-1}$ have a ratio (α/β) of less than 1.

In another embodiment, a gas barrier multilayer structure precursor according to the present invention comprises a support and a gas barrier layer precursor formed on the support, the gas barrier layer precursor comprising a layer (A) and a layer (B) that are obtained by applying a coating liquid (b) on the support and drying the coating to form the layer (B) and thereafter applying a coating liquid (a) and drying the coating to form the layer (A), the coating liquid (b) comprising a polyvalent metal compound, the coating liquid (a) comprising a polycarboxylic acid polymer and at least one silicon-containing compound (i) selected from the group consisting of one or more silane coupling agents represented by Formula (1) above, hydrolysates thereof and condensates of these compounds, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0, the layer (A) isolated from the support and the layer (B) and analyzed by a transmission method showing an infrared absorption spectrum in which the maximum peak height ($\alpha$) in the range of 1490 to 1659 $cm^{-1}$ and the maximum peak height ($\beta$) in the range of 1660 to 1750 $cm^{-1}$ have a ratio ($\alpha/\beta$) of less than 1.

A gas barrier multilayer structure according to the present invention is obtained by subjecting any of the above gas barrier multilayer structure precursors to at least one treatment selected from the group consisting of retort treatment, boil treatment and humidity conditioning treatment and comprises a support and a gas barrier layer formed on the support, the gas barrier layer comprising a layer (A') and a layer (B'), the layer (A') comprising a polycarboxylic acid polymer that is ionically crosslinked via a polyvalent metal ion and at least one silicon-containing compound (i) selected from the group consisting of one or more silane coupling agents represented by Formula (1) above, hydrolysates thereof and condensates of these compounds, the layer (B') comprising a polyvalent metal compound, the layer (A') isolated from the support and the layer (B') and analyzed by a transmission method showing an infrared absorption spectrum in which the maximum peak height ($\alpha$) in the range of 1490 to 1659 $cm^{-1}$ and the maximum peak height ($\beta$) in the range of 1660 to 1750 $cm^{-1}$ have a ratio ($\alpha/\beta$) of 1 or more.

A process for producing gas barrier multilayer structure precursors according to the present invention comprises a step (a step 1) of applying a coating liquid (a) on a support and drying the coating to form a layer (A), the coating liquid (a) comprising a polycarboxylic acid polymer and at least one silicon-containing compound (i) selected from the group consisting of one or more silane coupling agents represented by Formula (1) above, hydrolysates thereof and condensates of these compounds, and a step (a step 2) of applying a coating liquid (b) and drying the coating to form a layer (B), the coating liquid (b) comprising a polyvalent metal compound, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0.

In another embodiment, a process for producing gas barrier multilayer structure precursors according to the present invention comprises a step (a step I) of applying a coating liquid (b) on a support and drying the coating to form a layer (B), the coating liquid (b) comprising a polyvalent metal compound, and a step (a step II) of applying a coating liquid (a) and drying the coating to form a layer (A), the coating liquid (a) comprising a polycarboxylic acid polymer and at least one silicon-containing compound (i) selected from the group consisting of one or more silane coupling agents represented by Formula (1) above, hydrolysates thereof and condensates of these compounds, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0.

A process for producing gas barrier multilayer structures according to the present invention comprises subjecting any of the above gas barrier multilayer structure precursors to at least one treatment selected from the group consisting of retort treatment, boil treatment and humidity conditioning treatment.

Advantageous Effects of the Invention

The gas barrier multilayer structure precursors of the invention are not clouded even when exposed to cold water and have excellent abuse resistance. The gas barrier multilayer structures of the invention are obtained from the gas barrier multilayer structure precursors and achieve excellent gas barrier properties. The processes of the invention produce such gas barrier multilayer structure precursors and gas barrier multilayer structures.

The gas barrier multilayer structure precursors having the above properties may be suitably used as packaging materials for products such as foods, beverages, chemicals, drugs and precision metal parts such as electronic components. In an embodiment, food may be placed in a bag or the like prepared from the gas barrier multilayer structure precursor and may be subjected to high-temperature water treatment (e.g., heat sterilization) such as boiling or retort sterilization, through which the gas barrier multilayer structure precursor gives a gas barrier multilayer structure.

PREFERRED EMBODIMENTS FOR CARRYING OUT THE INVENTION

Hereinbelow, the present invention will be described in detail.

In the invention, the words excellent abuse resistance mean that the gas barrier multilayer structures obtained from the gas barrier multilayer structure precursors show good gas barrier properties even when the gas barrier multilayer structure precursors have undergone stress (abuse) such as stretching or flexing.

In the gas barrier multilayer structure precursors and the gas barrier multilayer structures of the invention, the layer (A) and the layer (A') show an infrared absorption spectrum in which the maximum peak height ($\alpha$) in the range of 1490 to 1659 $cm^{-1}$ and the maximum peak height ($\beta$) in the range of 1660 to 1750 $cm^{-1}$ have a ratio ($\alpha/\beta$) within a specific range due to the following reasons.

When the polycarboxylic acid polymer used in the invention is ionically crosslinked, an absorption peak derived from the C=O stretching vibration of the carboxyl group salt (—$COO^-$) appears near 1560 $cm^{-1}$, and the maximum peak height ($\alpha$) within 1490 to 1659 $cm^{-1}$ indicates the degree of formation of ionic crosslinking.

Before the ionic crosslinking, the carboxyl group shows an absorption peak derived from the C=O stretching vibration of the carboxyl group (—COOH) near 1720 $cm^{-1}$, and the maximum peak height ($\beta$) within 1660 to 1750 $cm^{-1}$ indicates the amount of carboxyl groups that are not involved in the ionic crosslinking.

In the gas barrier multilayer structure precursors of the invention, the ratio ($\alpha/\beta$) of the IR peaks is less than 1. When the ratio ($\alpha/\beta$) of the IR peaks is less than 1, many of the carboxyl groups of the polycarboxylic acid polymer in the layer (A) are not ionically crosslinked and the layer (A) has flexibility. Such flexible layer (A) will not be defected even if the gas barrier multilayer structure precursor is abused such as by stretching. The gas barrier multilayer structure precursor is then subjected to at least one treatment selected from retort treatment, boil treatment and humidity conditioning treatment. The treatment causes a reaction between the carboxyl groups of the polycarboxylic acid polymer and the polyvalent metal compound to form ionic crosslinking, resulting in a gas barrier multilayer structure with sufficient gas barrier properties.

In the gas barrier multilayer structures of the invention, the ratio ($\alpha/\beta$) of the IR peaks is not less than 1. When the ratio ($\alpha/\beta$) of the IR peaks is not less than 1, many of the carboxyl groups of the polycarboxylic acid polymer form ionic crosslinking with the polyvalent metal ions, and the gas barrier multilayer structures show excellent gas barrier properties.

<Gas Barrier Multilayer Structure Precursors>

The gas barrier multilayer structure precursors according to the present invention comprise a support and a gas barrier layer precursor formed on the support. The gas barrier layer precursor comprises a layer (A) and a layer (B). The layer (A) comprises a polycarboxylic acid polymer and at least one silicon-containing compound (i) selected from the group consisting of silane coupling agents represented by Formula (1) below, hydrolysates thereof and condensates of these compounds. The weight ratio of the polycarboxylic acid polymer and the silicon-containing compound (s) (i) in the layer (A) (the weight of the silicon compounds (i) other than the silane coupling agents is in terms of silane coupling agents) is in the range of 99.5:0.5 to 80.0:20.0. The layer (B) comprises a polyvalent metal compound. The layer (A) isolated from the support and the layer (B) and analyzed by a transmission method shows an infrared absorption spectrum in which the maximum peak height ($\alpha$) in the range of 1490 to 1659 cm$^{-1}$ and the maximum peak height ($\beta$) in the range of 1660 to 1750 cm$^{-1}$ have a ratio ($\alpha/\beta$) of less than 1.

$$Si(OR)_3Z \quad (1)$$

In Formula (1), R is a C1-6 alkyl group, Z is an organic group containing a glycidyloxy or amino group, and a plurality of R may be the same or different from one another.

The gas barrier multilayer structure precursors of the invention have a gas barrier layer precursor formed on a support. The gas barrier layer precursor has a layer (A) and a layer (B).

The gas barrier multilayer structure precursors have the following two typical embodiments.

In the first embodiment, the gas barrier multilayer structure precursor has a support and a gas barrier layer precursor formed on the support, the gas barrier layer precursor containing a layer (A) and a layer (B) that are obtained by applying a coating liquid (a) on the support and drying the coating to form the layer (A) and thereafter applying a coating liquid (b) and drying the coating to form the layer (B), the coating liquid (a) including a polycarboxylic acid polymer and at least one silicon-containing compound (i) selected from the group consisting of silane coupling agents represented by Formula (1) above, hydrolysates thereof and condensates of these compounds, the coating liquid (b) including a polyvalent metal compound, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0, the layer (A) isolated from the support and the layer (B) and analyzed by a transmission method showing an infrared absorption spectrum in which the maximum peak height ($\alpha$) in the range of 1490 to 1659 cm$^{-1}$ and the maximum peak height ($\beta$) in the range of 1660 to 1750 cm$^{-1}$ have a ratio ($\alpha/\beta$) of less than 1.

In the second embodiment, the gas barrier multilayer structure precursor has a support and a gas barrier layer precursor formed on the support, the gas barrier layer precursor containing a layer (A) and a layer (B) that are obtained by applying a coating liquid (b) on the support and drying the coating to form the layer (B) and thereafter applying a coating liquid (a) and drying the coating to form the layer (A), the coating liquid (b) including a polyvalent metal compound, the coating liquid (a) including a polycarboxylic acid polymer and at least one silicon-containing compound (i) selected from the group consisting of silane coupling agents represented by Formula (1) above, hydrolysates thereof and condensates of these compounds, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0, the layer (A) isolated from the support and the layer (B) and analyzed by a transmission method showing an infrared absorption spectrum in which the maximum peak height ($\alpha$) in the range of 1490 to 1659 cm$^{-1}$ and the maximum peak height ($\beta$) in the range of 1660 to 1750 cm$^{-1}$ have a ratio ($\alpha/\beta$) of less than 1.

Instead of using the coating liquid (b) in the first and second gas barrier multilayer structure precursors, the layer (B) may be formed by depositing a polyvalent metal compound on the layer (A) or the support by methods such as physical deposition or chemical deposition.

<Supports>

The support in the gas barrier multilayer structure precursor is a base for a gas barrier layer precursor described later. On the support, a coating liquid (a) or (b) described later is applied or a polyvalent metal compound is deposited.

The shapes of the supports are not particularly limited and may be for example films, sheets, bottles, cups, trays, tanks, tubes or tires, with films and sheets being preferable.

The thickness of the support may vary depending on applications but is generally from 5 µm to 5 cm. For use as films or sheets, the support thickness is preferably 5 to 800 µm, and more preferably 10 to 500 µm. For use as bottles, cups, trays or tanks, the support thickness is preferably 100 µm to 1 cm, and more preferably 150 µm to 80 mm. The support thickness is preferably 20 µm to 2 cm for use as tubes, and 1 to 5 cm for use as tires.

The support thickness in the above ranges ensures excellent workability and productivity in the respective applications.

The materials of the supports include plastics (including metal-deposited plastics and metal compound-deposited plastics), papers and rubbers. Of the materials, plastics are preferable from the viewpoint of adhesion of the support and the gas barrier layer precursor.

Examples of the plastics include polyolefin polymers such as low-density polyethylene, high-density polyethylene, linear low-density polyethylene, polypropylene, poly-4-methylpentene and cyclic polyolefins, and copolymers thereof and acid-modified products of these polymers; polyvinyl acetate and vinyl acetate copolymers such as ethylene/vinyl acetate copolymer, saponified ethylene/vinyl acetate copolymer and polyvinyl alcohols; polyester polymers such as polyethylene terephthalate, polybutylene terephthalate, polyethylene naphthalate, poly-ε-caprolactone, polyhydroxybutyrate and polyhydroxyvalerate, and copolymers thereof; polyamide polymers and copolymers such as nylon 6, nylon 66, nylon 12, nylon 6/nylon 66 copolymer, nylon 6/nylon 12 copolymer and meta-xylene adipamide/nylon 6 copolymer; polyether polymers such as polyethylene glycol, polyether sulfone, polyphenylene sulfide and polyphenylene oxide; chloride or fluoride polymers such as polyvinyl chloride, polyvinylidene chloride, polyvinyl fluoride and polyvinylidene fluoride, and copolymers thereof; acrylic polymers such as polymethyl acrylate, polyethyl acrylate, polymethyl methacrylate, polyethyl methacrylate and polyacrylonitrile, and copolymers thereof; polyimide polymers and copolymers; resins such as alkyd resins, melamine resins, acrylic resins, cellulose nitrate, urethane resins, unsaturated polyester resins, phenolic resins, amino resins, fluororesins and epoxy resins used in coating materials; and natural high-molecular weight compounds such as cellulose, starch, pullulan, chitin, chitosan, glucomannan, agarose and gelatin, and mixtures thereof.

To improve the adhesion between the support and the layer (A) or (B) or the adhesion between the support and the layer (A') or (B') in the gas barrier multilayer structures, the support may be surface-treated by corona treatment, flame treatment or plasma treatment whereby the surface of the support is activated. Further, the support may have an anchor coating layer on the surface.

Examples of the anchor coating resins include alkyd resins, melamine resins, acrylic resins, cellulose nitrate, urethane resins, polyester resins, phenolic resins, amino resins, fluororesins, epoxy resins and carbodiimide group-containing resins. Urethane resins, polyester resins, acrylic resins, epoxy resins and carbodiimide group-containing resins are preferred. The resins may be used singly, or two or more kinds may be used in combination.

Of the resins, urethane resins are particularly preferable. The polyols forming the urethane resins are preferably polyester polyols such as those obtained by reaction of polyvalent carboxylic acids with glycols.

Examples of the polyisocyanates forming the urethane resins include 2,4-tolylene diisocyanate, 2,6-tolylene diisocyanate, m-phenylene diisocyanate, p-phenylene diisocyanate, 4,4'-diphenylmethane diisocyanate, hexamethylene diisocyanate, xylylene diisocyanate and isophorone diisocyanate.

When the anchor coating layer is provided on the support, the thickness thereof is preferably 0.01 to 1 µm, and more preferably 0.05 to 1 µm from the viewpoint of adhesion and appearance.

When the layer (A) of the gas barrier multilayer structure precursor is provided adjacent to the support, it is preferable that the support has an anchor coating layer containing a carbodiimide group-containing resin. The anchor coating layer containing a carbodiimide group-containing resin provides excellent adhesion between the support and the layer (A); further, when the gas barrier multilayer structure precursor is subjected to retort treatment, boil treatment or humidity conditioning treatment, the resultant gas barrier multilayer structure achieves excellent adhesion and good productivity is obtained. The reason for the excellent adhesion and productivity is not clear, but the present inventors infer that the carbodiimide group is reacted with the carboxyl group in the layer (A) to contribute to improvement of adhesion between the layer (A) and the support.

In the case where the anchor coating layer contains a carbodiimide group-containing resin, a urethane resin is preferably contained together with the carbodiimide group-containing resin. When such gas barrier multilayer structure precursor is treated by retort treatment, boil treatment or humidity conditioning treatment, the resultant gas barrier multilayer structure achieves high adhesion between the support and the layer (A').

<Gas Barrier Layer Precursors>

In the gas barrier multilayer structure precursors of the invention, the gas barrier layer precursor is formed on the support and has a layer (A) and a layer (B).

The layer (A) and the layer (B) in the gas barrier layer precursor are preferably adjacent to each other.

The layer (A) includes a polycarboxylic acid polymer and at least one silicon-containing compound (i) selected from the group consisting of silane coupling agents represented by Formula (1) below, hydrolysates thereof and condensates of these compounds. The layer (B) includes a polyvalent metal compound.

$$Si(OR)_3Z \qquad (1)$$

In Formula (1), R is a C1-6 alkyl group, Z is an organic group containing a glycidyloxy or amino group, and a plurality of R may be the same or different from one another.

In the gas barrier multilayer structure precursors, the layer (A) isolated from the support and the layer (B) and analyzed by a transmission method shows an infrared absorption spectrum in which the maximum peak height (α) in the range of 1490 to 1659 $cm^{-1}$ and the maximum peak height (β) in the range of 1660 to 1750 $cm^{-1}$ have a ratio (α/β) of less than 1.

<Polycarboxylic Acid Polymers>

The layer (A) of the gas barrier layer precursor contains a polycarboxylic acid polymer. The polycarboxylic acid polymers refer to polymers having two or more carboxyl groups in the molecule. Examples of the polycarboxylic acid polymers include (co)polymers of ethylenically unsaturated carboxylic acids; copolymers of ethylenically unsaturated carboxylic acids and other ethylenically unsaturated monomers; and acidic polysaccharides having carboxyl groups in the molecule such as alginic acid, carboxymethylcellulose and pectin. The polycarboxylic acid polymers may be used singly, or two or more kinds may be used in combination.

Examples of the ethylenically unsaturated carboxylic acids include acrylic acid, methacrylic acid, itaconic acid, maleic acid, fumaric acid and crotonic acid. Examples of the ethylenically unsaturated monomers copolymerizable with these ethylenically unsaturated carboxylic acids include ethylene, propylene, saturated vinyl carboxylates such as vinyl acetate, alkyl acrylates, alkyl methacrylates, alkyl itaconates, vinyl chloride, vinylidene chloride, styrene, acrylamide and acrylonitrile.

From the viewpoint of gas barrier properties of the obtainable gas barrier multilayer structures, it is preferable that the polycarboxylic acid polymer is a polymer that contains structural units derived from at least one polymerizable monomer selected from acrylic acid, maleic acid, methacrylic acid, itaconic acid, fumaric acid and crotonic acid, or a mixture of such polymers. It is particularly preferable that the polycarboxylic acid polymer is a polymer that contains structural units derived from at least one polymerizable monomer selected from acrylic acid, maleic acid, methacrylic acid and itaconic acid, or a mixture of such polymers. The polymers may be homopolymers or copolymers. In the polymers, the structural units derived from at least one polymerizable monomer selected from acrylic acid, maleic acid, methacrylic acid and itaconic acid preferably represent 80 mol % or more, and more preferably 90 mol % or more of the polymer (the total of all structural units is 100 mol %). The polymers may contain structural units other than the above structural units, such as the above-described ethylenically unsaturated monomers copolymerizable with the ethylenically unsaturated carboxylic acids.

The polycarboxylic acid polymers usually have a number average molecular weight of 2,000 to 10,000,000. If the number average molecular weight is less than 2,000, the obtainable gas barrier multilayer structures fail to achieve sufficient water resistance and may be clouded or deteriorated in gas barrier properties or transparency by water. If the number average molecular weight exceeds 10,000,000, the obtainable coating liquid for the layer (A) will have so high a viscosity that application properties may be deteriorated. From the viewpoint of water resistance of the obtainable gas barrier multilayer structures, the number average molecular weight of the polycarboxylic acid polymers is preferably in the range of 5,000 to 1,000,000. The number average molecular weight is determined by gel permeation chromatography (GPC) relative to polystyrene standards.

The polycarboxylic acid polymers may be used singly, or two or more kinds may be used in combination.

In the polycarboxylic acid polymers, part of the carboxyl groups may be neutralized with a basic compound beforehand. Preferably, at least one basic compound is selected from the group consisting of polyvalent metal compounds, monovalent metal compounds and ammonia.

By partially neutralizing the carboxyl groups in the polycarboxylic acid polymers beforehand, the water resistance of the gas barrier layer precursors may be further improved. The neutralization degree for the carboxyl groups is preferably not more than 30 mol %, and more preferably not more than 25 mol % from the viewpoints of application properties and stability of the coating liquid (a).

(Silicon-Containing Compounds (i))

The layer (A) of the gas barrier layer precursor contains at least one silicon-containing compound (i) selected from the group consisting of silane coupling agents represented by Formula (1), hydrolysates thereof and condensates of these compounds.

In the invention, the "at least one silicon-containing compound (i) selected from the group consisting of silane coupling agents represented by Formula (1), hydrolysates thereof and condensates of these compounds" may be simply referred to as "the silicon-containing compounds (i)". Condensation products of hydrolysates of the silane coupling agents represented by Formula (1) may be referred to as the hydrolyzed condensates.

The silicon-containing compounds (i) may be the silane coupling agents represented by Formula (1), or hydrolysates of the compounds, or condensates of the compounds or hydrolysates. For example, hydrolyzed condensates of the silane coupling agents of Formula (1) by a sol-gel method may be used as the silicon-containing compounds (i).

The silane coupling agents of Formula (1) are readily hydrolyzed, and are readily condensed in the presence of acid or alkali. Accordingly, it is unlikely that the silicon-containing compound (i) exists purely as the silane coupling agent of Formula (1) alone, hydrolysate thereof alone, or condensate of the silane coupling agent or hydrolysate alone. In other words, the silicon-containing compound (i) is usually a mixture of the silane coupling agent of Formula (1), hydrolysate thereof and condensate of the silane coupling agent or hydrolysate. The hydrolysate may be a partial or complete hydrolysate.

Preferably, the silicon-containing compound (i) contains at least a hydrolyzed condensate. For the production of the hydrolyzed condensate, the silane coupling agent of Formula (1) may be directly mixed with a liquid containing the polycarboxylic acid polymer and water. Alternatively, the silane coupling agent may be hydrolyzed and condensed into a hydrolyzed condensate by addition of water before mixed with the polycarboxylic acid polymer.

$$Si(OR)_3Z \qquad (1)$$

In Formula (1), R is a C1-6 alkyl group, Z is an organic group containing a glycidyloxy or amino group, and a plurality of R may be the same or different from one another.

Examples of the silane coupling agents of Formula (1) include γ-glycidoxypropyl trimethoxysilane, γ-glycidoxypropyl triethoxysilane, γ-aminopropyl trimethoxysilane and γ-aminopropyl triethoxysilane, with γ-glycidoxypropyl trimethoxysilane and γ-aminopropyl trimethoxysilane being preferable. The silane coupling agents may be used singly, or two or more kinds may be used in combination.

In the gas barrier multilayer structure precursors of the invention, the gas barrier layer precursor has the layer (A) which contains the silicon-containing compound (i). The gas barrier multilayer structure precursors achieve excellent effects even with a small amount of the silicon-containing compound (i), providing cost advantages.

The silicon-containing compound (i) contains a hydrolyzed condensate as a result of reactions in which at least part of the alkoxy groups (OR) of the silane coupling agent of Formula (1) are substituted by hydroxyl groups to yield a hydrolysate and the hydrolysate is condensed to form a compound in which silicon atoms (Si) are bonded through an oxygen atom, and the condensation is repeated to afford a hydrolyzed condensate.

The amount of the silicon-containing compound(s) (i) in the layer (A) is preferably such that the weight ratio of the polycarboxylic acid polymer and the silicon-containing compound(s) (i) (polycarboxylic acid polymer:silicon-containing compound(s) (i)) is in the range of 99.5:0.5 to 80.0:20.0. Here, the weight of the silicon-containing compounds (i) other than the silane coupling agents of Formula (1) is in terms of the silane coupling agents of Formula (1). In detail, although the silicon-containing compound (i) is usually a mixture of the silane coupling agent of Formula (1), hydrolysate thereof and condensate of the silane coupling agent or hydrolysate, the weight of the silicon-containing compounds (i) is in terms of the silane coupling agent of Formula (1), that is, the weight represents the amount in which the silane coupling agent of Formula (1) is added.

When the silane coupling agent of Formula (1) is γ-glycidoxypropyl trimethoxysilane or γ-glycidoxypropyl triethoxysilane, the weight ratio between the polycarboxylic acid polymer and the silicon-containing compound (i) is preferably in the range of 99.5:0.5 to 90:10, and particularly preferably 99:1 to 95:5. When the silane coupling agent of Formula (1) is γ-aminopropyl trimethoxysilane or γ-aminopropyl triethoxysilane, the weight ratio between the polycarboxylic acid polymer and the silicon-containing compound (i) is preferably in the range of 99:1 to 80:20, and particularly preferably 95:5 to 80:20.

The above weight ratio ensures that the obtainable gas barrier multilayer structure precursors are not clouded even when exposed to cold water and have excellent abuse resistance, that the gas barrier multilayer structures obtained from the gas barrier multilayer structure precursors show excellent gas barrier properties, and that excellent adhesion between the support and the gas barrier layer is exhibited in the production of the gas barrier multilayer structures from the gas barrier multilayer structure precursors.

The layer (A) of the gas barrier multilayer structure precursor or the layer (A') of the gas barrier multilayer structure is homogeneous without phase separation because of containing the silicon-containing compound (i) in the above amount.

By containing the silicon-containing compound (i), the layer (A) of the gas barrier multilayer structure precursor or the layer (A') of the gas barrier multilayer structure has resistance to acids.

(Additives)

The layer (A) of the gas barrier layer precursor may contain various additives.

Exemplary additives are plasticizers, resins, dispersants, surfactants, softeners, stabilizers, anti-blocking agents, film-forming agents, tackifiers and oxygen absorbers.

The plasticizers may be appropriately selected from known plasticizers. Examples of the plasticizers include ethylene glycol, trimethylene glycol, propylene glycol, tetramethylene glycol, 1,3-butanediol, 2,3-butanediol, pentamethylene glycol, hexamethylene glycol, diethylene glycol, triethylene glycol, polyethylene glycol, polyvinyl alcohol, ethylene/vinyl alcohol copolymer, polyethylene oxide, sorbitol, mannitol, dulcitol, erythritol, glycerol, lactic acid, fatty acid, starch and phthalates. A mixture of these plasticizers may be used as required.

Of the above plasticizers, polyethylene glycol, polyvinyl alcohol, ethylene/vinyl alcohol copolymer, glycerol and starch are preferred from the viewpoints of stretching properties and gas barrier properties.

The plasticizers improve stretching properties of the gas barrier layer precursor, and the gas barrier multilayer structure precursor achieves further improved abuse resistance as a result.

When the layer (A) of the gas barrier layer precursor contains the additives, the weight ratio between the polycarboxylic acid polymer and the additives (polycarboxylic acid polymer:additives) is usually in the range of 70:30 to 99.9:0.1, and preferably 80:20 to 98:2.

(Coating Liquids (a))

The layer (A) of the gas barrier layer precursor is generally formed from a coating liquid (a). The coating liquid (a) contains the polycarboxylic acid polymer and at least one silicon-containing compound (i) selected from the silane coupling agents of Formula (1), hydrolysates thereof and condensates of these compounds. The coating liquid may contain the aforesaid additives as required.

The polycarboxylic acid polymers contained in the coating liquid (a) may be similar to the polycarboxylic acid polymers contained in the layer (A).

The at least one silicon-containing compound (i) in the coating liquid (a) selected from the silane coupling agents of Formula (1), hydrolysates thereof and condensates of these compounds may be similar to the silicon-containing compounds (i) contained in the layer (A).

From the viewpoint of gas barrier properties of the gas barrier multilayer structures, the weight ratio of the polycarboxylic acid polymer and the silicon-containing compound(s) (i) in the coating liquid (a) (polycarboxylic acid polymer:silicon-containing compound(s) (i)) is preferably in the range of 99.5:0.5 to 80.0:20.0. Here, the weight of the silicon-containing compounds (i) other than the silane coupling agents of Formula (1) is in terms of the silane coupling agents of Formula (1). In detail, although the silicon-containing compound (i) is usually a mixture of the silane coupling agent of Formula (1), hydrolysate thereof and condensate of the silane coupling agent or hydrolysate, the weight of the silicon-containing compound (i) is in terms of the silane coupling agent of Formula (1), that is, the weight represents the amount in which the at least one compound of Formula (1) is added.

When the silane coupling agent of Formula (1) is γ-glycidoxypropyl trimethoxysilane or γ-glycidoxypropyl triethoxysilane, the weight ratio between the polycarboxylic acid polymer and the silicon-containing compound (i) is preferably in the range of 99.5:0.5 to 90:10, and particularly preferably 99:1 to 95:5. When the silane coupling agent of Formula (1) is γ-aminopropyl trimethoxysilane or γ-aminopropyl triethoxysilane, the weight ratio between the polycarboxylic acid polymer and the silicon-containing compound (i) is preferably in the range of 99:1 to 80:20, and particularly preferably 95:5 to 80:20.

The above weight ratio ensures that the obtainable gas barrier multilayer structure precursors are not clouded even when exposed to cold water and have excellent abuse resistance, that the gas barrier multilayer structures obtained from the gas barrier multilayer structure precursors show excellent gas barrier properties, and that excellent adhesion between the support and the gas barrier layer is exhibited in the production of the gas barrier multilayer structures from the gas barrier multilayer structure precursors.

The layer (A) of the gas barrier multilayer structure precursor or the layer (A') of the gas barrier multilayer structure is homogeneous without phase separation because of containing the silicon-containing compound (i) in the above amount. By containing the silicon-containing compound (i), the layer (A) of the gas barrier multilayer structure precursor or the layer (A') of the gas barrier multilayer structure has resistance to acids.

The weight ratio between the polycarboxylic acid polymer and the silicon-containing compound (i) is usually similar between in the coating liquid (a) and in the layer (A). However, the ratio may differ in the event that the polycarboxylic acid polymer is reacted with the additives or the silicon-containing compound (i) during production of the gas barrier multilayer structure precursor.

Solvents for the coating liquid (a) are not particularly limited, but water is usually needed to hydrolyze the silane coupling agent of Formula (1). Water or a solvent mixture of water and an organic solvent may be used. Water is most preferable in view of solubility of the polycarboxylic acid polymer therein. Organic solvents such as alcohols are suitably used to obtain improved solubility of the silane coupling agent of Formula (1) or improved application properties of the coating liquid (a).

When the organic solvents are used, at least one organic solvent is preferably selected from C1-5 lower alcohols and C3-5 lower ketones.

Examples of the organic solvents include methanol, ethanol, propanol, isopropanol, n-butanol, isobutanol, sec-butanol, tert-butanol, acetone and methyl ethyl ketone.

The water is preferably purified water such as distilled water or ion exchanged water.

The solvent mixture of water and an organic solvent preferably contains the above water and organic solvent, and more preferably contains the water and C1-5 lower alcohol. The solvent mixture usually contains water at 20 to 95 wt % and the organic solvent at 80 to 5 wt % (the total of the water and organic solvent is 100 wt %).

From the viewpoint of application to the support or layer (B) described later, the solvent preferably contains an alcohol, and water is preferable in terms of cost.

From the viewpoints of gas barrier properties and application properties of the coating liquid (a), the coating liquid (a) preferably contains the polycarboxylic acid polymer, the silicon-containing compound (i) and optionally the additives in a total amount (solid weight) of 0.5 to 50 wt %, more preferably 0.8 to 30 wt %, and particularly preferably 1.0 to 20 wt % relative to the total weight of the coating liquid (a).

(Polyvalent Metal Compounds)

As already described, the gas barrier layer precursor is formed on the support and has the layer (A) and the layer (B) which are preferably adjacent to each other. The layer (B) contains a polyvalent metal compound.

The polyvalent metal compounds contained in the layer (B) of the gas barrier layer precursor are compounds of polyvalent metals having metal ions with a valence of two or greater. The polyvalent metals contained in the polyvalent metal compounds include alkaline earth metals such as beryllium, magnesium and calcium; transition metals such as titanium, zirconium, chromium, manganese, iron, cobalt, nickel, copper and zinc; aluminum; and silicon. From the viewpoints of water resistance and transparency, calcium compounds or zinc compounds are preferably used.

Examples of the polyvalent metal compounds include the above polyvalent metals themselves; oxides, hydroxides, carbonates, organic acid salts (e.g., acetates) and inorganic acid salts of the polyvalent metals; and ammonium complexes or secondary to quaternary amine complexes of the polyvalent metal oxides, and carbonates and organic acid salts thereof.

From the viewpoints of gas barrier properties, resistance to hot vapor and hot water and productivity, oxides, hydroxides, chlorides, carbonates and acetates of alkaline earth metals, cobalt, nickel, copper, zinc, aluminum or silicon; and ammonium complexes of copper or zinc, and carbonates thereof are preferably used.

In view of industrial productivity, zinc oxide, aluminum oxide, calcium hydroxide, calcium carbonate, zinc acetate and calcium acetate are more preferable, and zinc oxide and calcium carbonate are particularly preferable.

When the layer (B) is formed by applying a coating liquid (b) followed by drying, the polyvalent metal compound may be in the form of particles or other than particles or may be dissolved. From the viewpoints of dispersibility, gas barrier properties and productivity, the particle form is preferable.

The average particle diameter of such particles is not particularly limited, but in view of gas barrier properties and coating suitability it is preferably not more than 5 μm, more preferably not more than 1 μm, and particularly preferably not more than 0.1 μm.

The layer (B) of the gas barrier layer precursor may be formed by applying a coating liquid containing the polyvalent metal compound (a coating liquid (b) described later) and drying the coating. Alternatively, the layer may be formed by directly depositing the polyvalent metal compound by methods such as physical deposition or chemical deposition.

Exemplary physical deposition methods include vacuum deposition, sputtering and ion plating. Exemplary chemical deposition methods include plasma CVD and laser CVD.

An embodiment will be described below in which the layer is formed by applying the coating liquid (b) and drying the coating.

(Coating Liquids (b))

The layer (B) of the gas barrier layer precursor is preferably formed from a coating liquid (b) from the viewpoint of productivity. The coating liquid (b) contains a polyvalent metal compound and may contain various additives.

The polyvalent metal compounds contained in the coating liquid (b) may be similar to those contained in the layer (B). Calcium compounds or zinc compounds are preferable as the polyvalent metal compounds.

To achieve improved application properties to the support or the layer (A) and improved film-forming properties, the coating liquid (b) preferably contains a resin that is soluble or dispersible in the solvent used. Examples of such resins include alkyd resins, melamine resins, acrylic resins, urethane resins, polyester resins, phenolic resins, amino resins, fluororesins, epoxy resins and isocyanate resins.

To improve the dispersibility of the polyvalent metal compound, the coating liquid (b) preferably contains a dispersant that is soluble or dispersible in the solvent used.

Examples of the dispersants include anionic surfactants and nonionic surfactants. The surfactants include (poly)carboxylic acid salts, alkyl sulfate salts, alkyl benzenesulfonate salts, alkyl naphthalenesulfonate salts, alkyl sulfosuccinate salts, alkyl diphenyl ether disulfonate salts, alkyl phosphate salts, aromatic phosphates, polyoxyethylene alkyl ethers, polyoxyethylene alkylphenol ethers, polyoxyethylene alkyl esters, alkylallyl sulfate salts, polyoxyethylene alkyl phosphates, sorbitan alkyl esters, glycerin fatty acid esters, sorbitan fatty acid esters, sucrose fatty acid esters, polyethylene glycol fatty acid esters, polyoxyethylene sorbitan alkyl esters, polyoxyethylene alkylallyl ethers, polyoxyethylene derivatives, polyoxyethylene sorbitol fatty acid esters, polyoxy fatty acid esters and polyoxyethylene alkyl amines. The surfactants may be used singly, or two or more kinds may be used in combination.

The coating liquid (b) may optionally contain additives such as surfactants, softeners, stabilizers, film-forming agents and thickeners.

Exemplary solvents for the coating liquid (b) include water, methyl alcohol, ethyl alcohol, isopropyl alcohol, n-propyl alcohol, n-butyl alcohol, n-pentyl alcohol, dimethylsulfoxide, dimethylformamide, dimethylacetamide, toluene, hexane, heptane, cyclohexane, acetone, methyl ethyl ketone, diethyl ether, dioxane, tetrahydrofuran, ethyl acetate and butyl acetate. Of these, methyl alcohol, ethyl alcohol, isopropyl alcohol, toluene, ethyl acetate, methyl ethyl ketone and water are preferable in view of application properties. From the viewpoint of productivity, methyl alcohol, ethyl alcohol, isopropyl alcohol and water are preferable. Because the layer (A) formed from the coating liquid (a) has excellent water resistance, water may be used as a solvent in the coating liquid (b). The solvents may be used singly, or two or more kinds may be used in combination.

In view of coating suitability, it is preferable that the coating liquid (b) contains the polyvalent metal compound and the additives in a total amount of 1 to 50 wt %, more preferably 3 to 45 wt %, and particularly preferably 5 to 40 wt % based on the weight of the coating liquid (b).

When the coating liquid (b) contains the additives, the weight ratio between the polyvalent metal compound and the additives (polyvalent metal compound:additives) is usually in the range of 30:70 to 99:1, and preferably 50:50 to 98:2.

[Gas Barrier Multilayer Structure Precursors]

The gas barrier multilayer structure precursors according to the present invention include the support and the gas barrier layer precursor formed on the support. The gas barrier layer precursor has the layer (A) and the layer (B), which are preferably adjacent to each other. The layer (A) contains the polycarboxylic acid polymer and at least one silicon-containing compound (i) selected from the group consisting of the silane coupling agents represented by Formula (1), hydrolysates thereof and condensates of these compounds. The layer (B) contains the polyvalent metal compound. The layer (A) isolated from the support and the layer (B) and analyzed by a transmission method shows an infrared absorption spectrum in which the maximum peak height ($\alpha$) in the range of 1490 to 1659 $cm^{-1}$ and the maximum peak height ($\beta$) in the range of 1660 to 1750 $cm^{-1}$ have a ratio ($\alpha/\beta$) of less than 1.

In the gas barrier multilayer structure precursors, the layer (A) and the layer (B) are preferably adjacent to each other from the viewpoint of productivity. However, another layer may be provided between the layer (A) and the layer (B).

For example, a polyisocyanate layer may be provided between the layer (A) and the layer (B). When the layer (B) is formed from the coating liquid (b) adjacent to the layer (A), or when the layer (A) is formed from the coating liquid (a) adjacent to the layer (B), the layers (A) and (B) in the obtainable gas barrier multilayer structure precursor are adjacent to each other. Usual room conditions often satisfy the humidity and temperature conditions in the humidity conditioning treatment described later. Therefore, when the layers (A) and (B) are adjacent to each other, the carboxyl groups of the polycarboxylic acid polymer in the layer (A) may react with the polyvalent metal ions derived from the polyvalent metal compound in the layer (B) with the result that ionic crosslinking tends to be formed relatively early and the gas barrier multilayer structure precursor tends to form a gas barrier multilayer structure relatively early.

Such disadvantage is not encountered when the gas barrier multilayer structure precursor is laminated with another substrate or wound into a roll. However, when the layers (A) and (B) are adjacent to each other and the gas barrier layer precursor is stored for a long period exposed to air, the storage preferably takes place at low humidity and low temperature to inhibit the reaction forming the ionic crosslinking. The formation of ionic crosslinking may be retarded by providing a layer between the layer (A) and the layer (B). In detail, when a layer is provided between the layers (A) and (B), the polyvalent metal ions should travel from the layer (B) through the interposed layer to the layer (A), requiring more time to form the ionic crosslinking in the layer (A).

The gas barrier layer precursor of the gas barrier multilayer structure precursor contains each at least one layer (A) and layer (B), that is, the gas barrier layer precursor may contain one or more layers each. For example, the gas barrier layer precursor may contain three layers such as layer (A)/layer (B)/layer (A) or layer (B)/layer (A)/layer (B) on the support, or may contain four layers such as layer (A)/layer (B)/layer (A)/layer (B) or layer (B)/layer (A)/layer (B)/layer (A). Other layers may be provided between these layers. In the case of three or more layer structure, each one layer (A) and layer (B) may be formed by a method for producing gas barrier multilayer structure precursors as described later and thereafter an additional layer (A) or (B) may be formed similarly.

The above-described first and second gas barrier multilayer structure precursors represent preferred embodiments of the gas barrier multilayer structure precursors according to the present invention. These gas barrier multilayer structure precursors may be produced by first and second processes for producing gas barrier multilayer structure precursors as will be described later.

The thickness of the layer (A) is preferably in the range of 0.01 to 5 μm, more preferably 0.02 to 3 μm, and still more preferably 0.04 to 1.2 μm. This thickness ensures excellent gas barrier properties.

The thickness of the layer (B) is preferably in the range of 0.01 to 5 μm, more preferably 0.03 to 3 μm, and still more preferably 0.1 to 1.2 μm. This thickness ensures excellent gas barrier properties and appearance.

In the gas barrier multilayer structure precursors, the layer (B) may be formed without the coating liquid (b) by directly depositing the polyvalent metal compound on the layer (A) or the support.

An infrared absorption spectrum of the layer (A) may be obtained as follows. First, the layer (A) is isolated by, for example, separating the support and the gas barrier layer precursor (in which the layers (A) and (B) are preferably adjacent to each other) from each other and dissolving the layer (B) in an organic solvent such as toluene to isolate the layer (A). In the event that separating the support and the gas barrier layer precursor is difficult, propanol may be used to help the separation.

The isolated layer (A) is then analyzed by a transmission method using FT-IR 1710 manufactured by Perkin-Elmer to record an infrared absorption spectrum.

With respect to the infrared absorption spectrum obtained, a ratio ($\alpha/\beta$) is calculated between the maximum peak height ($\alpha$) in the range of 1490 to 1659 cm$^{-1}$ and the maximum peak height ($\beta$) in the range of 1660 to 1750 cm$^{-1}$.

For the layer (A') of the gas barrier multilayer structures described later, an infrared absorption spectrum may be obtained by separating the layer (A') from the support and the layer (B') and analyzing the isolated layer by a method similar to the layer (A).

Because of the layer (A) containing at least one silicon-containing compound (i) selected from the silane coupling agents of Formula (1), hydrolysates thereof and condensates of these compounds, the gas barrier multilayer structure precursors of the invention are not clouded even when exposed to cold water. Further, the layer (B) containing the polyvalent metal compound provides excellent abuse resistance. By subjecting the gas barrier multilayer structure precursor to at least one treatment selected from retort treatment, boil treatment and humidity conditioning treatment, the carboxyl groups of the polycarboxylic acid polymer in the layer (A) form ionic crosslinking with the polyvalent metal ions derived from the polyvalent metal compound in the layer (B), resulting in a gas barrier multilayer structure having excellent gas barrier properties. Taking advantage of this characteristic, the gas barrier multilayer structure precursors of the invention may be used as food packaging materials, in which case food may be placed in the gas barrier multilayer structure precursor and heat sterilized by retort treatment whereby the gas barrier multilayer structure precursor is converted to a gas barrier multilayer structure through the treatment.

[First Process for Producing Gas Barrier Multilayer Structure Precursors]

The first process for producing gas barrier multilayer structure precursors according to the invention produces the first gas barrier multilayer structure precursors described hereinabove.

The first process for producing gas barrier multilayer structure precursors comprises a step (a step 1) of applying the coating liquid (a) on the support and drying the coating to form the layer (A), the coating liquid (a) comprising the polycarboxylic acid polymer and at least one silicon-containing compound (i) selected from the silane coupling agents represented by Formula (1), hydrolysates thereof and condensates of these compounds, and a step (a step 2) of applying the coating liquid (b) and drying the coating to form the layer (B), the coating liquid (b) comprising the polyvalent metal compound, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0.

The process is described in detail hereinbelow.

The coating liquid (a) may be applied on the support by any methods without limitation. Exemplary methods are casting, dipping, roll coating, gravure coating, screen printing, reverse coating, spraying, kit coating, die coating, metalling bar coating, chamber doctor blade coating and curtain coating.

After the coating liquid (a) is applied on the support, the solvent of the coating liquid (a) is dried to form the layer (A)

on the support. The drying methods are not particularly limited. Exemplary methods are hot air drying, hot roll drying, infrared heating and microwave heating. These methods may be used singly or in combination. The drying temperature is not particularly limited, but is preferably in the range of 50 to 160° C. when the water or the water/organic solvent mixture as described hereinabove is used as the solvent. The drying pressure is preferably atmospheric pressure or reduced pressure, and more preferably atmospheric pressure from the viewpoint of simple equipment.

To increase the adhesion between the support and the layer (A), the support preferably has an anchor coating layer on the surface.

The anchor coating agents for the anchor coating layer include polymer materials such as polyurethane materials, polyester materials, polyacrylic materials and epoxy polymer materials. A urethane anchor coating agent containing a polyol component and isocyanate is preferable.

From the viewpoint of adhesion between the support and the layer (A), an anchor coating agent that contains a carbodiimide group-containing resin is preferably used.

After the completion (or substantial completion) of the drying or after the completion of aging treatment described later, heat treatment may be performed in order to increase the proportion of condensates in the layer (A) relative to the at least one silicon-containing compound (i) selected from the silane coupling agents represented by Formula (1), hydrolysates thereof and condensates of these compounds.

Even if the gas barrier multilayer structure precursors are produced without such heat treatment, the gas barrier multilayer structure precursors can be treated by retort treatment, boil treatment or humidity conditioning treatment while ensuring high adhesion between the layer (A) and the support or the layer (B) and can give gas barrier multilayer structures having excellent gas barrier properties and water resistance.

When γ-aminopropyl trimethoxysilane or γ-aminopropyl triethoxysilane is used as the silane coupling agent of Formula (1), heat treatment may be performed to cause reaction between the carboxyl groups of the polycarboxylic acid polymer and the amino groups of the silane coupling agent whereby improved water resistance is provided.

The heat treatment is usually performed at 120 to 240° C., preferably 150 to 230° C. for 10 seconds to 30 minutes, preferably 20 seconds to 20 minutes.

The drying, the aging treatment and the heat treatment have partially similar conditions such as temperature. These treatments do not need to be clearly separated and may be performed continuously.

The coating liquid (a) is preferably applied and dried such that the thickness of the obtainable layer (A) will be in the range of 0.01 to 5 μm, more preferably 0.02 to 3 μm, and still more preferably 0.04 to 1.2 μm.

The layer (A) contains the polycarboxylic acid polymer and at least one silicon-containing compound (i) selected from the silane coupling agents represented by Formula (1), hydrolysates thereof and condensates of these compounds. When the coating liquid (a) contains other components such as the additives, the layer (A) will naturally contain such components.

After the layer (A) is formed on the support, the layer (B) is formed, preferably by applying the coating liquid (b) on the layer (A) and drying the coating, thereby producing a gas barrier multilayer structure precursor. Prior to the application of the coating liquid (b) on the layer (A), another layer may be provided on the layer (A).

In a preferred embodiment, the coating liquid (b) is applied on the layer (A). The application methods are not particularly limited. Exemplary methods are casting, dipping, roll coating, gravure coating, screen printing, reverse coating, spraying, kit coating, die coating, metalling bar coating, chamber doctor blade coating and curtain coating.

In a preferred embodiment, the layer (B) is formed on the layer (A) by applying the coating liquid (b) on the layer (A) and drying the solvent of the coating liquid (b). The drying methods are not particularly limited. Exemplary methods are hot air drying, hot roll drying, infrared heating and microwave heating. These methods may be used singly or in combination. The drying temperature is not particularly limited, but is preferably in the range of 50 to 160° C. when the water or the water/organic solvent mixture as described hereinabove is used as the solvent. The drying pressure is preferably atmospheric pressure or reduced pressure, and more preferably atmospheric pressure from the viewpoint of simple equipment.

The coating liquid (b) is preferably applied and dried such that the thickness of the obtainable layer (B) will be in the range of 0.01 to 5 μm, more preferably 0.03 to 3 μm, and still more preferably 0.1 to 1.2 μm.

The layer (B) contains the polyvalent metal compound. When the coating liquid (b) contains other components other than the solvent, the layer (B) will naturally contain such components.

When an anchor coating layer is provided on the surface of the support, aging treatment may be performed after an anchor coating agent is applied and dried on the support, or after the coating liquid (a) is applied and dried on the anchor coated support to form the layer (A), or after the coating liquid (b) is applied and dried to form the layer (B). In an embodiment, the aging treatment may be performed at 30 to 200° C., preferably 30 to 150° C. for 0.5 to 10 days, preferably 1 to 7 days.

The first gas barrier multilayer structure precursors are produced as described above.

In the gas barrier multilayer structure precursors produced by the first production process, because the layer (B) containing the polyvalent metal compound is formed on the previously formed layer (A), samples with good appearance can be obtained. When the layer (B) is formed from a coating liquid (b) containing water as solvent, the ionic crosslinking formation proceeds during application of the coating liquid (b) and the water resistance and gas barrier properties of the layer (A) are further improved.

[Second Process for Producing Gas Barrier Multilayer Structure Precursors]

The second process for producing gas barrier multilayer structure precursors according to the invention produces the second gas barrier multilayer structure precursors described hereinabove.

The second process for producing gas barrier multilayer structure precursors comprises a step (a step I) of applying the coating liquid (b) on the support and drying the coating to form the layer (B), the coating liquid (b) comprising the polyvalent metal compound, and a step (a step II) of applying the coating liquid (a) and drying the coating to form the layer (A), the coating liquid (a) comprising the polycarboxylic acid polymer and at least one silicon-containing compound (i) selected from the silane coupling agents represented by Formula (1), hydrolysates thereof and condensates of these compounds, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0.

The process is described in detail hereinbelow.

The coating liquid (b) may be applied on the support by any methods without limitation. Exemplary methods are casting, dipping, roll coating, gravure coating, screen printing, reverse coating, spraying, kit coating, die coating, metalling bar coating, chamber doctor blade coating and curtain coating.

After the coating liquid (b) is applied on the support, the solvent of the coating liquid (b) is dried to form the layer (B) on the support. The drying methods are not particularly limited. Exemplary methods are hot air drying, hot roll drying, infrared heating and microwave heating. These methods may be used singly or in combination. The drying temperature is not particularly limited, but is preferably in the range of 50 to 160° C. when the water or the water/organic solvent mixture as described hereinabove is used as the solvent. The drying pressure is preferably atmospheric pressure or reduced pressure, and more preferably atmospheric pressure from the viewpoint of simple equipment.

The layer (B) contains the polyvalent metal compound. When the coating liquid (b) contains other components other than the solvent, the layer (B) will naturally contain such components.

To increase the adhesion between the support and the layer (B), the support preferably has an anchor coating layer on the surface.

In an embodiment using the support having an anchor coating layer on the surface, an anchor coating agent is applied on the support and dried to form an anchor coating layer, and the coating liquid (b) is applied on the anchor coated support and dried to form the layer (B).

The coating liquid (b) is preferably applied and dried such that the thickness of the obtainable layer (B) will be in the range of 0.01 to 5 µm, more preferably 0.03 to 3 µm, and still more preferably 0.1 to 1.2 µm.

After the layer (B) is formed on the support, the layer (A) is formed, preferably by applying the coating liquid (a) on the layer (B) and drying the coating, thereby producing a second gas barrier multilayer structure precursor. Prior to the application of the coating liquid (a) on the layer (B), another layer may be provided on the layer (B).

In an embodiment in which the layer (B) and the layer (A) are adjacent to each other, the coating liquid (a) is applied on the layer (B). The application methods are not particularly limited. Exemplary methods are casting, dipping, roll coating, gravure coating, screen printing, reverse coating, spraying, kit coating, die coating, metalling bar coating, chamber doctor blade coating and curtain coating.

After the coating liquid (a) is applied on the layer (B), the solvent of the coating liquid (a) is dried to form the layer (A) on the layer (B). The drying methods are not particularly limited. Exemplary methods are hot air drying, hot roll drying, infrared heating and microwave heating. These methods may be used singly or in combination. The drying temperature is not particularly limited, but is preferably in the range of 50 to 160° C. when the water or the water/organic solvent mixture as described hereinabove is used as the solvent. The drying pressure is preferably atmospheric pressure or reduced pressure, and more preferably atmospheric pressure from the viewpoint of simple equipment.

When an anchor coating layer is provided on the surface of the support to increase the adhesion between the support and the layer (B), aging treatment may be performed after an anchor coating agent is applied and dried on the support, or after the coating liquid (b) is applied and dried on the anchor coated support to form the layer (B), or after the coating liquid (a) is applied and dried to form the layer (A). In an embodiment, the aging treatment may be performed at 30 to 200° C., preferably 30 to 150° C. for 0.5 to 10 days, preferably 1 to 7 days.

After the completion (or substantial completion) of the drying or after the completion of aging treatment described later, heat treatment may be performed in order to increase the proportion of condensates in the layer (A) relative to the at least one silicon-containing compound (i) selected from the silane coupling agents represented by Formula (1), hydrolysates thereof and condensates of these compounds.

Even if the gas barrier multilayer structure precursors are produced without such heat treatment, the gas barrier multilayer structure precursors can be treated by retort treatment, boil treatment or humidity conditioning treatment while ensuring high adhesion between the layer (A) and the support or the layer (B) and can give gas barrier multilayer structures having excellent gas barrier properties and water resistance.

When γ-aminopropyl trimethoxysilane or γ-aminopropyl triethoxysilane is used as the silane coupling agent of Formula (1), heat treatment may be performed to cause reaction between the carboxyl groups of the polycarboxylic acid polymer and the amino groups of the silane coupling agent whereby improved water resistance is provided.

The heat treatment is usually performed at 120 to 240° C., preferably 150 to 230° C. for 10 seconds to 30 minutes, preferably 20 seconds to 20 minutes.

The drying, the aging treatment and the heat treatment have partially similar temperature conditions. These treatments do not need to be clearly separated and may be performed continuously.

The coating liquid (a) is preferably applied and dried such that the thickness of the obtainable layer (A) will be in the range of 0.01 to 5 µm, more preferably 0.02 to 3 µm, and still more preferably 0.04 to 1.2 µm.

The layer (A) contains the polycarboxylic acid polymer and at least one silicon-containing compound (i) selected from the silane coupling agents represented by Formula (1), hydrolysates thereof and condensates of these compounds. When the coating liquid (a) contains other components such as the additives, the layer (A) will naturally contain such components.

The second gas barrier multilayer structure precursors are produced as described above.

In the second production process for gas barrier multilayer structure precursors, when the layer (A) is formed on the polyvalent metal-containing layer (B) from a coating liquid (a) containing water as solvent, the ionic crosslinking formation proceeds during the application of the coating liquid (a) and the water resistance of the layer (A) is further improved.

In the first and second processes for producing gas barrier multilayer structure precursors, the coating liquid (a) may contain as an additive a compound having two or more hydroxyl groups such as polyvinyl alcohol, and such hydroxyl groups may form ester bonds with part of the carboxyl groups of the polycarboxylic acid polymer.

Gas barrier multilayer structure precursors may be manufactured without using the coating liquid (b) used in the first and second production processes for gas barrier multilayer structure precursors. Without the coating liquid (b), gas barrier multilayer structure precursors may be produced by depositing the polyvalent metal compound on the layer (A) or the support to form the layer (B).

The deposition methods include physical deposition and chemical deposition. Exemplary physical deposition methods include vacuum deposition, sputtering and ion plating. Exemplary chemical deposition methods include plasma CVD and laser CVD.

[Gas Barrier Multilayer Structures]

The gas barrier multilayer structures according to the present invention are obtained by subjecting the gas barrier multilayer structure precursors to at least one treatment selected from retort treatment, boil treatment and humidity conditioning treatment, and include the support and a gas barrier layer formed on the support. The gas barrier layer contains a layer (A') and a layer (B'). The layer (A') includes a polycarboxylic acid polymer that is ionically crosslinked with a polyvalent metal ion, and at least one silicon-containing compound (i) selected from silane coupling agents represented by Formula (1), hydrolysates thereof and condensates of these compounds. The layer (B') includes a polyvalent metal compound. The layer (A') isolated from the support and the layer (B') and analyzed by a transmission method shows an infrared absorption spectrum in which the maximum peak height ($\alpha$) in the range of 1490 to 1659 cm$^{-1}$ and the maximum peak height ($\beta$) in the range of 1660 to 1750 cm$^{-1}$ have a ratio ($\alpha/\beta$) of 1 or more. The upper limit of the ratio ($\alpha/\beta$) is generally 200 in view of gas barrier properties.

The gas barrier multilayer structures of the invention may be obtained by subjecting the gas barrier multilayer structure precursors to at least one treatment selected from retort treatment, boil treatment and humidity conditioning treatment.

The retort treatment is pressure sterilization of microorganisms such as fungi, yeast and bacteria, for the preservation of food or the like. In general, the gas barrier multilayer structure precursors containing food are pressurized and sterilized at 105 to 140° C. and 0.15 to 0.3 MPa for 10 to 120 minutes. Steam retort apparatuses use hot vapor, and hot water retort apparatuses utilize pressurized hot water. These apparatuses are appropriately selected in accordance with sterilization conditions for contents such as food.

The boil treatment is sterilization by moist heat for the preservation of food or the like. The boiling conditions vary depending on the contents, but in the case of food or the like the gas barrier multilayer structure precursors are sterilized at 60 to 100° C. and atmospheric pressure for 10 to 120 minutes. The boil treatment is usually carried out with a hot water bath. In a batch system, the gas barrier multilayer structure precursors are soaked in a hot water bath at a predetermined temperature and are collected after a prescribed time. In a continuous sterilization system, the gas barrier multilayer structure precursors are passed through a tunnel of hot water bath.

In the humidity conditioning treatment, the gas barrier multilayer structure precursors are allowed to stand at 10 to 99° C., atmospheric pressure and 20 to 99% RH. An optimum humidity conditioning time varies depending on the temperature and humidity. The lower the temperature and the humidity, the longer the humidity conditioning time. The higher the temperature and the humidity, the shorter the treatment. For example, humidity conditioning at 20° C. and 80% RH, 40° C. and 90% RH, or 60° C. and 90% RH requires at least 10 hours, at least 3 hours or at least 30 minutes, respectively, in order to produce multilayer structures having sufficient gas barrier properties. When another support is laminated on the surface of the gas barrier multilayer structure precursor through an adhesive, humidity conditioning will require longer time compared to without such lamination in order to achieve sufficient gas barrier properties.

By subjecting the gas barrier multilayer structure precursors to at least one treatment selected from the retort treatment, the boil treatment and the humidity conditioning treatment, the polycarboxylic acid polymer in the layer (A) and the polyvalent metal compound in the layer (B) are reacted together and the polycarboxylic acid polymer is ionically crosslinked with the polyvalent metal ions. The resultant gas barrier multilayer structures have a layer (A') containing such polycarboxylic acid polymer and at least one silicon-containing compound (i) selected from the silane coupling agents represented by Formula (1), hydrolysates thereof and condensates of these compounds; and a layer (B') containing the polyvalent metal compound. As a result of the ionic crosslinking of the polycarboxylic acid polymer with the polyvalent metal ions derived from the polyvalent metal compound, sufficient gas barrier properties are obtained.

The gas barrier multilayer structures generally have an oxygen permeability at 20° C. and 80% RH of not more than 300 cm$^3$ (STP)/m$^2$·day·MPa, preferably not more than 200 cm$^3$ (STP)/m$^2$·day·MPa, more preferably not more than 100 cm$^3$ (STP)/m$^2$·day·MPa, and particularly preferably not more than 10 cm$^3$ (STP)/m$^2$·day·MPa. Lower oxygen permeability is more preferable. The lower limit of the oxygen permeability is not particularly limited but is usually 0.01 cm$^3$ (STP)/(m$^2$·day·MPa).

Even when the gas barrier multilayer structure precursors have been abused by stress such as stretching or flexing, the gas barrier multilayer structures show sufficient gas barrier properties as a result of the at least one treatment selected from the retort treatment, the boil treatment and the humidity conditioning treatment.

When the abuse resistance is evaluated under conditions described in the working examples of the invention, the gas barrier multilayer structures generally have an oxygen permeability at 20° C. and 80% RH of not more than 300 cm$^3$ (STP)/m$^2$·day·MPa, preferably not more than 200 cm$^3$ (STP)/m$^2$·day·MPa, more preferably not more than 100 cm$^3$ (STP)/m$^2$·day·MPa, and particularly preferably not more than 10 cm$^3$ (STP)/m$^2$·day·MPa. Lower oxygen permeability is more preferable. The lower limit of the oxygen permeability is not particularly limited but is usually 0.01 cm$^3$ (STP)/(m$^2$·day·MPa).

In the gas barrier multilayer structures, the thickness of the layer (A') is preferably in the range of 0.01 to 5 μm, more preferably 0.02 to 3 μm, and particularly preferably 0.04 to 1.2 μm.

In the gas barrier multilayer structures, the thickness of the layer (B') is preferably in the range of 0.01 to 5 μm, more preferably 0.03 to 3 μm, and particularly preferably 0.1 to 1.2 μm.

The above thicknesses of the layers (A') and (B') ensure excellent gas barrier properties.

The gas barrier multilayer structures have excellent gas barrier properties and are not clouded even when exposed to cold water. They may be suitably used as packaging materials for products sensitive to oxygen or the like such as foods, beverages, chemicals, drugs and precision metal parts such as electronic components, or as packaging materials for products requiring hot water treatment (heat sterilization) such as boiling or retort sterilization, or as packages for containing such packaged products. From the viewpoint of productivity, shapes of packaging materials (e.g., bags, trays) are given to the gas barrier multilayer structure precursors.

The gas barrier multilayer structures may be laminated with other supports for the purpose of increased strength, sealing properties, easy seal breakage, design, light shielding or moisture proofness. The at least one treatment selected from the retort treatment, the boil treatment and the humidity conditioning treatment may be performed after an additional support is laminated on the gas barrier multilayer structure precursor.

The additional supports may be selected appropriately depending on purpose. Plastic films are generally preferable. A single plastic film or a laminate having two or more plastic films may be used.

In an embodiment, a lamination method using an adhesive may be adopted. Exemplary lamination methods include dry laminating methods, wet laminating methods and extrusion laminating methods. The thickness of the additional supports is preferably in the range of 1 to 1000 μm, more preferably 5 to 500 μm, particularly preferably 5 to 200 μm, and most preferably 5 to 150 μm.

The additional supports may be laminated in any position without limitation. From the viewpoint of handleability of products, preferred lamination embodiments include polyethylene terephthalate (support)/layer (A')/layer (B')/polyolefin (plastic film, additional support), nylon (support)/layer (A')/layer (B')/polyolefin (plastic film, additional support), polypropylene (support)/layer (A')/layer (B')/polyolefin (plastic film, additional support), paper (support)/layer (A')/layer (B')/polyolefin (plastic film, additional support), polyethylene terephthalate (support)/layer (A')/layer (B')/nylon (plastic film, additional support)/polyolefin (plastic film, additional support), and polyethylene terephthalate (support)/layer (A')/layer (B')/metal-deposited nylon (plastic film, additional support)/polyolefin (plastic film, additional support). Of these, polyethylene terephthalate (support)/layer (A')/layer (B')/polyolefin (plastic film, additional support), polyethylene terephthalate (support)/layer (A')/layer (B')/nylon (plastic film, additional support)/polyolefin (plastic film, additional support), and polyethylene terephthalate (support)/layer (A')/layer (B')/metal-deposited nylon (plastic film, additional support)/polyolefin (plastic film, additional support) are more preferable, and polyethylene terephthalate (support)/layer (A')/layer (B')/polyolefin (plastic film, additional support), and polyethylene terephthalate (support)/layer (A')/layer (B')/nylon (plastic film, additional support)/polyolefin (plastic film, additional support) are particularly preferable. In the above lamination embodiments, the layer (A') and the layer (B') may be reversed.

The multilayer constitution [support/gas barrier layer/additional support] not only imparts strength, sealing properties, easy seal breakage, design, light shielding effects, humidity proofness and oxygen absorption properties to the gas barrier multilayer structures, but also prevents the gas barrier layer from direct contact with hot water or vapor in the retort treatment, boil treatment or humidity conditioning treatment, resulting in good appearance of the gas barrier multilayer structures.

[Processes for Producing Gas Barrier Multilayer Structures]

The processes for producing gas barrier multilayer structures of the present invention produce the above gas barrier multilayer structures. In the processes, the gas barrier multilayer structure precursors are subjected to at least one treatment selected from retort treatment, boil treatment and humidity conditioning treatment.

The retort treatment is pressure sterilization of microorganisms such as fungi, yeast and bacteria for the preservation of food or the like. In general, the gas barrier multilayer structure precursors containing food are pressurized and sterilized at 105 to 140° C. and 0.15 to 0.3 MPa for 10 to 120 minutes. Steam retort apparatuses use hot vapor, and hot water retort apparatuses utilize pressurized hot water. These apparatuses are appropriately selected in accordance with sterilization conditions for contents such as food.

The boil treatment is sterilization by moist heat for the preservation of food or the like. The boiling conditions vary depending on the contents, but in the case of food or the like the gas barrier multilayer structure precursors are sterilized at 60 to 100° C. and atmospheric pressure for 10 to 120 minutes. The boil treatment is usually carried out with a hot water bath. In a batch system, the gas barrier multilayer structure precursors are soaked in a hot water bath at a predetermined temperature and are collected after a prescribed time. In a continuous sterilization system, the gas barrier multilayer structure precursors are passed through a tunnel of hot water bath.

In the humidity conditioning treatment, the gas barrier multilayer structure precursors are allowed to stand at 10 to 99° C., atmospheric pressure and 20 to 99% RH. An optimum humidity conditioning time varies depending on the temperature and humidity. The lower the temperature and the humidity, the longer the humidity conditioning time. The higher the temperature and the humidity, the shorter the treatment. For example, humidity conditioning at 20° C. and 80% RH, 40° C. and 90% RH, or 60° C. and 90% RH requires at least 10 hours, at least 3 hours or at least 30 minutes, respectively, in order to produce multilayer structures having sufficient gas barrier properties. When another support is laminated on the surface of the gas barrier multilayer structure precursor through an adhesive, humidity conditioning will require longer time compared to without such lamination in order to achieve sufficient gas barrier properties.

EXAMPLES

The present invention will be described in detail by presenting examples hereinbelow without limiting the scope of the invention.

Gas barrier multilayer structure precursors (X), laminate films (Y) containing the gas barrier multilayer structure precursors (X), and gas barrier multilayer structures (Z) and gas barrier multilayer structures (Z') obtained in Examples and Comparative Examples were analyzed and evaluated as described in (1) to (3) below.

(1-1) Water Resistance (Example 1 and Comparative Examples 1 to 4)

Distilled water was dropped on a layer (B) of a gas barrier multilayer structure precursor (X) and was allowed to stand for 10 minutes. The water was then wiped off and the film was visually observed.

In Comparative Examples 3 and 4, distilled water was dropped on a layer (A-2) after soaking in an aqueous zinc acetate solution (Comparative Example 3) or an aqueous calcium acetate solution (Comparative Example 4), and was allowed to stand for 10 minutes. The water was then wiped off and the film was visually observed.

(1-2) Water Resistance (Examples 2 to 7 and Comparative Examples 5 to 9)

An unstretched polyethylene film (PE: LLDPE, T.U.X.™-HC manufactured by TOHCELLO CO., LTD., thickness: 60 μm) was dry laminated on a layer (A3) (Example 2), a layer (ZE) (Examples 3 and 4, and Comparative Examples 5 to 7), a layer (ZR) (Examples 5 to 7), a layer (A4) (Comparative Example 8) or a layer (A8) (Comparative Example 9) of a gas barrier multilayer structure precursor (X) through a two-component adhesive (A620/A65 manufactured by Mitsui Chemicals Polyurethanes Inc.). Laminate films (Y-6) to (Y-16) with the gas barrier multilayer structure precursor (X) were thus obtained which had a constitution [gas barrier multilayer structure precursor (X)/adhesive layer/LLDPE (60 μm)].

The laminate films (Y-6) to (Y-16) were heat sealed with use of tabletop vacuum sealer V-301 (manufactured by FUJI IMPULSE CO., LTD.) to give 10 cm×10 cm pouches. Sliced potato having an average diameter of 5 cm and an average thickness of 5 mm was placed in the pouches and vacuum packaged therein with use of tabletop vacuum sealer V-301 (manufactured by FUJI IMPULSE CO., LTD.).

The pouches containing the potato were boil treated in hot water at 60° C. for 60 minutes, and the appearance of the pouches was evaluated as follows (Examples 2 to 4, 6 and 7, and Comparative Examples 5 to 9).

In Example 5, the pouch containing the potato was boil treated in a pH-3 aqueous acetic acid solution at 60° C. for 10 minutes, and the appearance of the pouch was evaluated as follows.

A: Delamination was not visually observed.
B: Delamination was visually observed.

(2-1) Abuse Resistance (Oxygen Permeability after 10% Stretching Followed by Humidity Conditioning Treatment, Retort Treatment or Boil Treatment) (Example 1, and Comparative Examples 1 to 4)

A laminate film (Y) containing a gas barrier multilayer structure precursor (X) (Example 1, and Comparative Examples 1 and 2), or a laminate film (Y) containing a gas barrier multilayer structure (Z) (Comparative Examples 3 and 4) was cut to a size of 15 cm×20 cm. The film piece was 10% stretched for 1 minute with use of Tensilon manufactured by Toyo Baldwin Co., Ltd. The stretched laminate film (Y) containing a gas barrier multilayer structure precursor (X) (Example 1, and Comparative Examples 1 and 2), or the stretched laminate film (Y) containing a gas barrier multilayer structure (Z) (Comparative Examples 3 and 4) was subjected to humidity conditioning treatment, retort treatment or boil treatment under conditions as described in respective Example and Comparative Examples for producing gas barrier multilayer structure (Z) (gas barrier multilayer structure (Z') in Comparative Examples 3 and 4), and water attached to the film was wiped off. After the laminate film (Y) containing a gas barrier multilayer structure precursor (X) (Example 1, and Comparative Examples 1 and 2), or the laminate film (Y) containing a gas barrier multilayer structure (Z) (Comparative Examples 3 and 4) was stretched and treated by humidity conditioning treatment, retort treatment or boil treatment as described above, the oxygen permeability was measured at 20° C. and 80% RH with use of an oxygen permeability tester (OXTRAN 2/20 manufactured by Modern Control Inc.) in accordance with JIS K 7126, B method (equal pressure method) and ASTM D 3985-81 and was expressed with a unit [$cm^3$ (STP)/$m^2 \cdot day \cdot MPa$].

Here, (STP) indicates standard conditions (0° C., 1 atm) for determining the oxygen volume.

(2-2) Abuse Resistance (Oxygen Permeability after 10% Stretching Followed by Humidity Conditioning Treatment, Retort Treatment or Boil Treatment) (Examples 2 to 7, and Comparative Examples 5 to 9)

Laminate films (Y-6) to (Y-16) were obtained as described in the evaluation of water resistance (1-2).

Each of the laminate films (Y-6) to (Y-16) was cut to a size of 15 cm×20 cm. The film piece was 10% stretched for 1 minute with use of Tensilon manufactured by Toyo Baldwin Co., Ltd. The stretched laminate films (Y-6) to (Y-16) were each subjected to humidity conditioning treatment, retort treatment or boil treatment under conditions as described in respective Examples and Comparative Examples for producing gas barrier multilayer structure (Z), and water attached to the film was wiped off. After the laminate films (Y-6) to (Y-16) were stretched and treated by humidity conditioning treatment, retort treatment or boil treatment as described above, the oxygen permeability was measured at 20° C. and 80% RH with use of an oxygen permeability tester (OXTRAN 2/20 manufactured by Modern Control Inc.) in accordance with JIS K 7126, B method (equal pressure method) and ASTM D 3985-81 and was expressed with a unit [$cm^3$ (STP)/$m^2 \cdot day \cdot MPa$].

(3) Gas Barrier Properties

The oxygen permeability of gas barrier multilayer structures (Z) (Examples 1 to 7, and Comparative Examples 1, 2 and 5 to 9) and gas barrier multilayer structures (Z') (Comparative Examples 3 and 4) was measured at 20° C. and 80% RH with use of an oxygen permeability tester (OXTRAN 2/20 manufactured by Modern Control Inc.) in accordance with JIS K 7126, B method (equal pressure method) and ASTM D 3985-81 and was expressed with a unit [$cm^3$ (STP)/$m^2 \cdot day \cdot MPa$].

(4) Spectrum Peak Ratio

A layer (A) of a gas barrier multilayer structure precursor (X) or a layer (A') of a gas barrier multilayer structure (Z) was separated from a support while being dissolved with propanol, and a layer (B) or a layer (B') was wiped off with toluene to isolate the layer (A) or the layer (A').

The layer (A) or the layer (A') was analyzed by a transmission method with FT-IR 1710 manufactured by Perkin-Elmer, and an infrared absorption spectrum was obtained.

With respect to the infrared absorption spectrum, the maximum peak height ($\alpha$) in the range of 1490 to 1659 $cm^{-1}$ and the maximum peak height ($\beta$) in the range of 1660 to 1750 $cm^{-1}$ were determined, and the peak height ratio ($\alpha/\beta$) as the spectrum peak ratio was calculated.

The spectrum peak ratio was rounded off to the first decimal place.

Example 1

<Production of Coating Liquid (a-1)>

20 g of an aqueous solution of polyacrylic acid having a number average molecular weight of 200,000 (PAA: Aron A-10H manufactured by TOAGOSEI CO., LTD., solid concentration: 25 wt %) was dissolved in 58.9 g of distilled water. Thereafter, 0.44 g of aminopropyl trimethoxysilane (APTMS, manufactured by Aldrich) was added, and the mixture was stirred to give a homogeneous solution as a coating liquid (a-1).

<Production of Gas Barrier Multilayer Structure Precursor, Laminate Film and Gas Barrier Multilayer Structure>

A two-component anchor coating agent (AC: A525 and A52 manufactured by Mitsui Chemicals Polyurethanes Inc.) was applied with a bar coater on a biaxially stretched polyethylene terephthalate film (PET: LUMIRROR (registered trademark) P60 manufactured by TORAY INDUSTRIES INC., thickness: 12 µm, inside: corona treated) such that the dry thickness would be 0.2 µm. The coating was dried, and a support having an anchor coating layer was prepared.

On the anchor coating layer of the support, the coating liquid (a-1) was applied with a bar coater such that the dry thickness thereof would be 1 µm. The coating was dried at 80° C. for 5 minutes, then aged at 50° C. for 3 days, and heat treated at 200° C. for 5 minutes. Thus, a multilayer structure with a layer (A-1) from the coating liquid (a-1) was obtained which had a constitution [PET (12 µm)/AC (0.2 µm)/layer (A-1) (1 µm)].

On the layer (A-1) of the multilayer structure, a fine particulate zinc oxide dispersion (a coating liquid (b-1): ZS303 manufactured by SUMITOMO OSAKA CEMENT Co., Ltd., average particle diameter: 0.02 µm, solid concentration: 30 wt %, dispersion medium: toluene) was applied with a bar coater such that the dry thickness thereof would be 1 µm. The coating was then dried at 90° C. for 2 minutes to form a layer (B-1). Thus, a gas barrier multilayer structure precursor (X-1)

was obtained which had a constitution [PET (12 µm)/AC (0.2 µm)/layer (A-1) (1 µm)/layer (B-1) (1 µm)].

On the layer (B-1) of the gas barrier multilayer structure precursor (X-1), a biaxially stretched nylon film (Ny: Emblem ONUM manufactured by UNITIKA LTD., thickness: 15 µm) was dry laminated through a two-component adhesive (A620 and A65 manufactured by Mitsui Chemicals Polyurethanes Inc.). On the Ny film, an unstretched polypropylene film (CPP: TORAYFAN NO ZK93FM manufactured by TORAY ADVANCED FILM CO., LTD., thickness: 60 µm) was laminated through the above-described two-component adhesive. Thus, a laminate film (Y-1) with the gas barrier multilayer structure precursor (X-1) was obtained which had a constitution [gas barrier multilayer structure precursor (X-1)/adhesive layer/Ny (15 µm)/adhesive layer/CPP (60 µm)].

The laminate film (Y-1) containing the gas barrier multilayer structure precursor (X-1) was cut to a size of 20 cm×20 cm. The film piece was retort treated in a hot water retort vessel at 0.2 MPa and 120° C. for 40 minutes. A gas barrier multilayer structure (Z-1) was thus manufactured.

The gas barrier multilayer structure precursor (X-1), the laminate film (Y-1) containing the gas barrier multilayer structure precursor (X-1), and the gas barrier multilayer structure (Z-1) were tested to evaluate the water resistance (1), the abuse resistance (2), the gas barrier properties (3) and the spectrum peak ratio (4) by the foregoing methods. The results are set forth in Tables 1 to 3.

Comparative Example 1

<Production of Aqueous Polyacrylic Acid Solution>

25.2 g of an aqueous solution of polyacrylic acid having a number average molecular weight of 200,000 (PAA: Aron A-10H manufactured by TOAGOSEI CO., LTD., solid concentration: 25 wt %) was dissolved in 74.8 g of distilled water to give an aqueous polyacrylic acid solution having a solid concentration of 6.3 wt %.

<Production of Gas Barrier Multilayer Structure>

The procedures of Example 1 were repeated except that the coating liquid (a-1) was replaced by the aqueous polyacrylic acid solution, thereby obtaining a multilayer structure with a layer (PAA) from the aqueous polyacrylic acid solution which had a constitution [PET (12 µm)/AC (0.2 µm)/layer (PAA) (1 µm)].

On the layer (PAA) of the multilayer structure, the fine particulate zinc oxide dispersion (the coating liquid (b-1)) was applied as described in Example 1. A gas barrier multilayer structure precursor (X-2) having a constitution [PET (12 µm)/AC (0.2 µm)/layer (PAA) (1 µm)/layer (B-1) (1 µm)], and a laminate film (Y-2) with the gas barrier multilayer structure precursor (X-2) which had a constitution [gas barrier multilayer structure (X-2)/adhesive layer/Ny (15 µm)/adhesive layer/CPP (60 µm)] were obtained as described in Example 1.

The laminate film (Y-2) containing the gas barrier multilayer structure precursor (X-2) was cut to a size of 20 cm×20 cm. The film piece was retort treated as described in Example 1, and a gas barrier multilayer structure (Z-2) was manufactured.

The gas barrier multilayer structure precursor (X-2), the laminate film (Y-2) containing the gas barrier multilayer structure precursor (X-2), and the gas barrier multilayer structure (Z-2) were tested to evaluate the water resistance (1), the abuse resistance (2), the gas barrier properties (3) and the spectrum peak ratio (4) by the foregoing methods. The results are set forth in Tables 1 to 3.

Comparative Example 2

<Production of Gas Barrier Multilayer Structure>

A layer (B-2) was formed on the layer (PAA) in the same manner as in Comparative Example 1, except that the fine particulate zinc oxide dispersion (the coating liquid (b-1)) was replaced by a calcium carbonate dispersion (a coating liquid (b-2): obtained by finely pulverizing calcium carbonate from Wako Pure Chemical Industries, Ltd. in an agate mortar and dispersing the particles in ethanol with an ultrasonic homogenizer (average particle diameter: 0.06 calcium carbonate concentration: 10 wt %). A gas barrier multilayer structure precursor (X-3) having a constitution [PET (12 µm)/AC (0.2 µm)/layer (PAA) (1 µm)/layer (B-2) (1 µm)], and a laminate film with the gas barrier multilayer structure precursor (X-3) which had a constitution [gas barrier multilayer structure precursor (X-3)/adhesive layer/Ny (15 µm)/adhesive layer/CPP (60 µm)] were obtained as described in Comparative Example 1.

The laminate film (Y-3) containing the gas barrier multilayer structure precursor (X-3) was cut to a size of 20 cm×20 cm. The film piece was retort treated as described in Example 1, and a gas barrier multilayer structure (Z-3) was manufactured.

The gas barrier multilayer structure precursor (X-3), the laminate film (Y-3) containing the gas barrier multilayer structure precursor (X-3), and the gas barrier multilayer structure (Z-3) were tested to evaluate the water resistance (1), the abuse resistance (2), the gas barrier properties (3) and the spectrum peak ratio (4) by the foregoing methods. The results are set forth in Tables 1 to 3.

Comparative Example 3

<Production of Coating Liquid (a-2)>

80 g of an aqueous solution of polyacrylic acid having a number average molecular weight of 200,000 (PAA: Aron A-10H manufactured by TOAGOSEI CO., LTD., solid concentration: 25 wt %) was dissolved in 120 g of distilled water to give an aqueous polyacrylic acid solution having a solid concentration of 10 wt %.

Subsequently, 6.84 g of tetramethoxysilane (TMOS) was dissolved in 8.2 g of methanol, and 1.36 g of γ-glycidoxypropyl trimethoxysilane (GPTMS) was dissolved in the solution. The resultant solution was then combined with 0.51 g of distilled water and 1.27 g of 0.1N hydrochloric acid to give a sol. The sol was stirred at 10° C. for 1 hour to perform hydrolysis and condensation, resulting in a gel.

The gel obtained above was diluted with 18.5 g of distilled water and was added to 63.4 g of the above-prepared 10 wt % aqueous polyacrylic acid solution with stirring to give a coating liquid (a-2).

<(Production of Gas Barrier Multilayer Structure Precursor Laminate Film and Gas Barrier Multilayer Structure)>

The procedures of Example 1 were repeated except that the coating liquid (a-1) was replaced by the coating liquid (a-2), thereby obtaining a gas barrier multilayer structure precursor (X-4) with a layer (A-2) from the coating liquid (a-2) which had a constitution [PET (12 μm)/AC (0.2 μm)/layer (A-2) (1 μm)].

The gas barrier multilayer structure precursor (X-4) was soaked in an aqueous zinc acetate solution (10 wt % concentration) at 80° C. for 20 seconds.

The surface of the multilayer structure was washed with distilled water at 25° C. and was dried at 80° C. for 5 minutes. Thus, a gas barrier multilayer structure (Z-4) was obtained which had a constitution [PET (12 μm)/AC (0.2 μm)/layer (A-2) (treated by soaking in zinc acetate) (1 μm)].

On the layer (A-2) (treated by soaking in zinc acetate) of the gas barrier multilayer structure (Z-4), a biaxially stretched nylon film and an unstretched polypropylene film were laminated in the same manner as in Example 1 to produce a laminate film (Y-4) with the gas barrier multilayer structure (Z-4) which had a constitution [gas barrier multilayer structure (Z-4)/adhesive layer/Ny (15 μm)/adhesive layer/CPP (60 μm)].

The laminate film (Y-4) containing the gas barrier multilayer structure (Z-4) was cut to a size of 20 cm×20 cm. The film piece was retort treated as described in Example 1, and a gas barrier multilayer structure (Z'-4) was manufactured.

The gas barrier multilayer structure precursor (X-4), the laminate film (Y-4) containing the gas barrier multilayer structure (Z-4), and the gas barrier multilayer structure (Z'-4) were tested to evaluate the water resistance (1), the abuse resistance (2), the gas barrier properties (3) and the spectrum peak ratio (4) by the foregoing methods. The results are set forth in Tables 1 to 3.

Comparative Example 4

The procedures of Comparative Example 3 were repeated except that the aqueous zinc acetate solution was replaced by an aqueous calcium acetate solution (10 wt % concentration), thereby obtaining a gas barrier multilayer structure precursor (X-5) having a constitution [PET (12 μm)/AC (0.2 μm)/layer (A-2) (1 μm)], a gas barrier multilayer structure (Z-5) having a constitution [PET (12 μm)/AC (0.2 μm)/layer (A-2) (treated by soaking in calcium acetate) (1 μm)], and a laminate film (Y-5) with the gas barrier multilayer structure (Z-5) which had a constitution [gas barrier multilayer structure (Z-5)/adhesive layer/Ny (15 μm)/adhesive layer/CPP (60 μm)].

The laminate film (Y-5) containing the gas barrier multilayer structure (Z-5) was cut to a size of 20 cm×20 cm. The film piece was retort treated as described in Example 1, and a gas barrier multilayer structure (Z'-5) was manufactured.

The gas barrier multilayer structure precursor (X-5), the laminate film (Y-5) containing the gas barrier multilayer structure (Z-5), and the gas barrier multilayer structure (Z'-5) were tested to evaluate the water resistance (1), the abuse resistance (2), the gas barrier properties (3) and the spectrum peak ratio (4) by the foregoing methods. The results are set forth in Tables 1 to 3.

TABLE 1

|  | Layer (A) | | Layer (B) | |
|---|---|---|---|---|
|  | Polycarboxylic acid polymer | Silane coupling agent | Polyvalent metal compound | Metal ion supply method |
| Ex. 1 | Polyacrylic acid | *1 | Zinc oxide | Formation of layer by coating |
| Comp. Ex. 1 | Polyacrylic acid | — | Zinc oxide | Formation of layer by coating |
| Comp. Ex. 2 | Polyacrylic acid | — | Calcium carbonate | Formation of layer by coating |
| Comp. Ex. 3 | Polyacrylic acid | *2 | Zinc acetate | Soaking in aqueous solution*3 |
| Comp. Ex. 4 | Polyacrylic acid | *2 | Calcium acetate | Soaking in aqueous solution*3 |

*1: aminopropyl trimethoxysilane
*2: tetramethoxysilane and γ-glycidoxypropyl trimethoxysilane
*3 Soaking in the aqueous solution did not form a layer.

TABLE 2

|  | Water resistance | | Abuse resistance | | Gas barrier properties | |
|---|---|---|---|---|---|---|
|  | Evaluation sample | Condition after water dropping | Evaluation sample | Oxygen permeability (II) | Evaluation sample | Oxygen permeability (I) |
| Ex. 1 | Gas barrier multilayer structure precursor (X-1) | Transparent | Laminate film (Y-6) | 3 | Gas barrier multilayer structure (Z-6) | 3 |
| Comp. Ex. 1 | Gas barrier multilayer structure precursor (X-2) | Clouded | Laminate film (Y-9) | 3 | Gas barrier multilayer structure (Z-9) | 3 |

TABLE 2-continued

| | Water resistance | | Abuse resistance | | Gas barrier properties | |
|---|---|---|---|---|---|---|
| | Evaluation sample | Condition after water dropping | Evaluation sample | Oxygen permeability (II) | Evaluation sample | Oxygen permeability (I) |
| Comp. Ex. 2 | Gas barrier multilayer structure precursor (X-3) | Clouded | Laminate film (Y-10) | 3 | Gas barrier multilayer structure (Z-10) | 3 |
| Comp. Ex. 3 | Gas barrier multilayer structure precursor (X-4) | Transparent | Laminate film (Y-11) | 100 | Gas barrier multilayer structure (Z'-11) | 3 |
| Comp. Ex. 4 | Gas barrier multilayer structure precursor (X-5) | Transparent | Laminate film (Y-12) | 100 | Gas barrier multilayer structure (Z'-12) | 3 |

Oxygen permeability (I) and (II) were measured at 20° C. and 80% RH, unit [$cm^3$ (STP)/$m^2 \cdot day \cdot MPa$].

TABLE 3

Spectrum peak ratio

| Evaluation sample | Peak ratio | Evaluation sample | Peak ratio |
|---|---|---|---|
| Ex. 1 | Gas barrier multilayer structure precursor (X-1) | 0.0 | Gas barrier multilayer structure (Z-1) | 2.3 |
| Comp. Ex. 1 | Gas barrier multilayer structure precursor (X-2) | 0.0 | Gas barrier multilayer structure (Z-2) | 2.3 |
| Comp. Ex. 2 | Gas barrier multilayer structure precursor (X-3) | 0.0 | Gas barrier multilayer structure (Z-3) | 2.3 |
| Comp. Ex. 3 | Gas barrier multilayer structure precursor (X-4) | 0.0 | Gas barrier multilayer structure (Z'-4) | 2.2 |
| Comp. Ex. 4 | Gas barrier multilayer structure precursor (X-5) | 0.0 | Gas barrier multilayer structure (Z'-5) | 2.1 |

[Preparation of Coating Liquids (a3) to (a11)]

In Examples 2 to 7 and Comparative Examples 5 to 9, coating liquids (a3) to (a11) were used.

(Preparation of coating liquids (a3) to (a11))

A polycarboxylic acid polymer and a metal compound were dissolved in distilled water and isopropyl alcohol (IPA) in the amounts shown in Table 4, and a silane coupling agent in the amount shown in the table was added to the solution. The mixture was stirred for 1 hour to give a homogeneous solution. Coating liquids (a3) to (a11) were prepared in this manner. The coating liquid (a5) was a homogeneous white turbid liquid.

The chemical compositions of the coating liquids (a3) to (a11) are shown in Table 4.

In Table 4, the polyacrylic acid is polyacrylic acid having a number average molecular weight of 200,000 (Wako Pure Chemical Industries, Ltd.), γ-GPTMS is γ-glycidoxypropyl trimethoxysilane (Shin-Etsu Chemical Co., Ltd.), NaOH is sodium hydroxide (Wako Pure Chemical Industries, Ltd.), ZnO is zinc oxide (Wako Pure Chemical Industries, Ltd.), $CaCO_3$ is calcium carbonate (Wako Pure Chemical Industries, Ltd.), and γ-APTMS is γ-aminopropyl trimethoxysilane (Aldrich).

TABLE 4

| Coating liquid | Polycarboxylic acid | [g] | Metal compound | [g] | Silane coupling agent | [g] | Weight ratio*[1] | Water [g] | IPA [g] | Neutralization degree*[2] |
|---|---|---|---|---|---|---|---|---|---|---|
| a3 | Polyacrylic acid | 4.8 | — | — | γ-GPTMS | 0.2 | 96:4 | 25.0 | 70.0 | — |
| a4 | Polyacrylic acid | 9.7 | NaOH | 1.9 | γ-GPTMS | 0.3 | 97:3 | 70.0 | 20.0 | 35 mol % |
| a5 | Polyacrylic acid | 2.45 | ZnO | 0.27 | γ-GPTMS | 0.05 | 98:2 | 60 | 37 | 20 mol % |
| a6 | Polyacrylic acid | 0.99 | $CaCO_3$ | 0.08 | γ-GPTMS | 0.01 | 99:1 | 99 | 0 | 12 mol % |
| a7 | Polyacrylic acid | 4.75 | ZnO | 0.4 | γ-APTMS | 0.25 | 95:5 | 95 | 0 | 15 mol % |
| a8 | Polyacrylic acid | 8.2 | NaOH | 0.3 | γ-APTMS | 1.8 | 82:18 | 50 | 40 | 7 mol % |
| a9 | Polyacrylic acid | 5 | — | — | — | — | 100:0 | 95 | 0 | — |
| a10 | Polyacrylic acid | 9.99 | ZnO | 0.4 | γ-GPTMS | 0.01 | 99.9:0.1 | 80 | 10 | 7 mol % |
| a11 | Polyacrylic acid | 5 | NaOH | 0.1 | γ-GPTMS | 5 | 50:50 | 70 | 30 | 4 mol % |

*[1]Polycarboxylic acid weight:silane coupling agent weight
*[2]Neutralization degree relative to 100 mol % of carboxyl groups of polyacrylic acid

Example 2

9.0 g of dry laminating adhesive TAKELAC A525 (manufactured by Mitsui Chemicals Polyurethanes Inc.) and 1.0 g of curing agent TAKENATE A52 (manufactured by Mitsui Chemicals Polyurethanes Inc.) were dissolved in 25.0 g of ethyl acetate (Wako Pure Chemical Industries, Ltd.) to give an anchor coating liquid (ac-1).

100 g of zinc oxide fine particulate aqueous dispersion ZE143 (manufactured by SUMITOMO OSAKA CEMENT Co., Ltd.) and 1 g of curing agent Liofol HAERTER UR 5889-21 (manufactured by Henkel) were mixed together to give a coating liquid (ze).

The coating liquid (ac-1) was applied with a bar coater on a biaxially stretched polyethylene terephthalate film (PET: LUMIRROR (registered trademark) P60 manufactured by TORAY INDUSTRIES INC., thickness: 12 μm, inside: corona treated) such that the dry thickness would be 0.2 μm. The coating was dried, and a support having an anchor coating layer (AC-1) was prepared.

On the anchor coating layer (AC-1) of the support, the coating liquid (ze) was applied with a bar coater such that the dry thickness thereof would be 1 μm. The coating was dried at 90° C. for 2 minutes to form a layer (ZE). Thus, a multilayer structure was obtained which had a constitution [PET (12 μm)/AC-1 (0.2 μm)/layer (ZE) (1 μm)].

On the layer (ZE) of the multilayer structure, the coating liquid (a3) was applied with a bar coater such that the dry thickness thereof would be 0.5 μm. The coating was then dried at 140° C. for 1 minute and aged at 50° C. for 2 days. Thus, a gas barrier multilayer structure precursor (X-6) with a layer (A3) from the coating liquid (a3) was obtained which had a constitution [PET (12 μm)/AC-1 (0.2 μm)/layer (ZE) (1 μm)/layer (A3) (0.5 μm)]. The gas barrier multilayer structure precursor (X-6) was cut to a size of 20 cm×20 cm. The piece was boil treated (in a boiling vessel at 80° C. for 60 minutes). A gas barrier multilayer structure (Z-6) was thus manufactured.

The gas barrier multilayer structure precursor (X-6) and the gas barrier multilayer structure (Z-6) were tested to evaluate the water resistance (1), the abuse resistance (2), the gas barrier properties (3) and the spectrum peak ratio (4) by the foregoing methods. The results are set forth in Tables 5 and 6.

Example 3

The coating liquid (ac-1) was applied with a bar coater on a biaxially stretched polyethylene terephthalate film (PET: LUMIRROR (registered trademark) P60 manufactured by TORAY INDUSTRIES INC., thickness: 12 μm, inside: corona treated) such that the dry thickness would be 0.2 μm. The coating was dried, and a support having an anchor coating layer (AC-1) was prepared.

On the anchor coating layer (AC-1) of the support, the coating liquid (a4) was applied with a bar coater such that the dry thickness thereof would be 0.5 The coating was then dried at 140° C. for 1 minute and aged at 50° C. for 2 days. Thus, a multilayer structure with a layer (A4) from the coating liquid (a4) was obtained which had a constitution [PET (12 μm)/AC-1 (0.2 μm)/layer (A4) (0.5 μm)]

On the layer (A4) of the multilayer structure, the coating liquid (ze) was applied with a bar coater such that the dry thickness thereof would be 1 μm. The coating was dried at 90° C. for 2 minutes to form a layer (ZE). Thus, a gas barrier multilayer structure precursor (X-7) was obtained which had a constitution [PET (12 μm)/AC-1 (0.2 μm)/layer (A4) (0.5 μm)/layer (ZE) (1 μm)].

The gas barrier multilayer structure precursor (X-7) was cut to a size of 20 cm×20 cm. The piece was subjected to humidity conditioning treatment (in a thermo-hygrostat at 40° C. and 90% RH for 2 days). A gas barrier multilayer structure (Z-7) was thus manufactured.

The gas barrier multilayer structure precursor (X-7) and the gas barrier multilayer structure (Z-7) were tested to evaluate the water resistance (1), the abuse resistance (2), the gas barrier properties (3) and the spectrum peak ratio (4) by the foregoing methods. The results are set forth in Tables 5 and 6.

Example 4

A gas barrier multilayer structure precursor (X-8) having a constitution [PET (12 μm)/AC-1 (0.2 μm)/layer (A5) (0.5 μm)/layer (ZE) (1 μm)] was obtained (Example 4) in the same manner as in Example 3, except that the coating liquid (a4) was replaced by the coating liquid (a5).

The gas barrier multilayer structure precursor (X-8) was cut to a size of 20 cm×20 cm. The piece was retort treated (in a hot water retort vessel at 0.2 MPa and 120° C. for 40 minutes). A gas barrier multilayer structure (Z-8) was thus manufactured.

The gas barrier multilayer structure precursor (X-8) and the gas barrier multilayer structure (Z-8) were tested to evaluate the water resistance (1), the abuse resistance (2), the gas barrier properties (3) and the spectrum peak ratio (4) by the foregoing methods. The results are set forth in Tables 5 and 6.

Example 5

9.0 g of dry laminating adhesive TAKELAC A525 (manufactured by Mitsui Chemicals Polyurethanes Inc.) and 1.0 g of curing agent TAKENATE A52 (manufactured by Mitsui Chemicals Polyurethanes Inc.) were dissolved in 25.0 g of ethyl acetate (Wako Pure Chemical Industries, Ltd.). The solution was then mixed with 0.02 g of carbodiimide group-containing resin crosslinking agent V-05 (CARBODILITE manufactured by Nisshinbo Chemical Inc.) to give an anchor coating liquid (ac-2).

100 g of zinc oxide fine particulate toluene dispersion ZR133 (manufactured by SUMITOMO OSAKA CEMENT Co., Ltd.) and 3 g of curing agent Z-1 (manufactured by SUMITOMO OSAKA CEMENT Co., Ltd.) were mixed together to give a coating liquid (zr).

The coating liquid (ac-2) was applied with a bar coater on a biaxially stretched polyethylene terephthalate film (PET: LUMIRROR (registered trademark) P60 manufactured by TORAY INDUSTRIES INC., thickness: 12 μm, inside: corona treated) such that the dry thickness would be 0.2 μm. The coating was dried, and a support having an anchor coating layer (AC-2) was prepared.

On the anchor coating layer (AC-2) of the support, the coating liquid (a6) was applied with a bar coater such that the dry thickness thereof would be 0.5 μm. The coating was dried at 140° C. for 1 minute and aged at 50° C. for 2 days. Thus, a multilayer structure with a layer (A6) from the coating liquid (a6) was obtained which had a constitution [PET (12 μm)/AC-2 (0.2 μm)/layer (A6) (0.5 μm)].

On the layer (A6) of the multilayer structure, the coating liquid (zr) was applied with a bar coater such that the dry thickness thereof would be 1 μm. The coating was then dried at 90° C. for 2 minutes to form a layer (ZR). Thus, a gas barrier multilayer structure precursor (X-9) was obtained which had a constitution [PET (12 μm)/AC-2 (0.2 μm)/layer (A6) (0.5 μm)/layer (ZR) (1 μm)].

The gas barrier multilayer structure precursor (X-9) was cut to a size of 20 cm×20 cm. The piece was retort treated in the same manner as in Example 4 to afford a gas barrier multilayer structure (Z-9).

The gas barrier multilayer structure precursor (X-9) and the gas barrier multilayer structure (Z-9) were tested to evaluate the water resistance (1), the abuse resistance (2), the gas barrier properties (3) and the spectrum peak ratio (4) by the foregoing methods. The results are set forth in Tables 5 and 6.

Example 6

A gas barrier multilayer structure precursor (X-10) having a constitution [PET (12 μm)/AC-2 (0.2 μm)/layer (A7) (0.5 μm)/layer (ZR) (1 μm)] was obtained in the same manner as in Example 5, except that the coating liquid (a6) was replaced by the coating liquid (a7) and that the aging treatment at 50° C. for 2 days was replaced by heat treatment at 180° C. for 15 minutes.

The gas barrier multilayer structure precursor (X-10) was cut to a size of 20 cm×20 cm. The piece was retort treated in the same manner as in Example 4 to afford a gas barrier multilayer structure (Z-10).

The gas barrier multilayer structure precursor (X-10) and the gas barrier multilayer structure (Z-10) were tested to evaluate the water resistance (1), the abuse resistance (2), the gas barrier properties (3) and the spectrum peak ratio (4) by the foregoing methods. The results are set forth in Tables 5 and 6.

Example 7

A gas barrier multilayer structure precursor (X-11) having a constitution [PET (12 μm)/AC-2 (0.2 μm)/layer (A8) (0.5 μm)/layer (ZR) (1 μm)] was obtained in the same manner as in Example 5, except that the coating liquid (a6) was replaced by the coating liquid (a8).

The gas barrier multilayer structure precursor (X-11) was cut to a size of 20 cm×20 cm. The piece was retort treated in the same manner as in Example 4 to afford a gas barrier multilayer structure (Z-11) (Example 7).

The gas barrier multilayer structure precursor (X-11) and the gas barrier multilayer structure (Z-11) were tested to evaluate the water resistance (1), the abuse resistance (2), the gas barrier properties (3) and the spectrum peak ratio (4) by the foregoing methods. The results are set forth in Tables 5 and 6.

Comparative Example 5

A gas barrier multilayer structure precursor (X-12) having a constitution [PET (12 μm)/AC-1 (0.2 μm)/layer (A9) (0.5 μm)/layer (ZE) (1 μm)] was obtained in the same manner as in Example 3, except that the coating liquid (a4) was replaced by the coating liquid (a9).

The gas barrier multilayer structure precursor (X-12) was cut to a size of 20 cm×20 cm. The piece was retort treated in the same manner as in Example 4 to afford a gas barrier multilayer structure (Z-12).

The gas barrier multilayer structure precursor (X-12) and the gas barrier multilayer structure (Z-12) were tested to evaluate the water resistance (1), the abuse resistance (2), the gas barrier properties (3) and the spectrum peak ratio (4) by the foregoing methods. The results are set forth in Tables 5 and 6.

Comparative Examples 6 and 7

A gas barrier multilayer structure precursor (X-13) having a constitution [PET (12 μm)/AC-1 (0.2 μm)/layer (A10) (0.5 μm)/layer (ZE) (1 μm)] (Comparative Example 6) and a gas barrier multilayer structure precursor (X-14) having a constitution [PET (12 μm)/AC-1 (0.2 μm)/layer (A11) (0.5 μm)/layer (ZE) (1 μm)] (Comparative Example 7) were obtained in the same manner as in Example 3, except that the coating liquid (a4) was replaced by the coating liquid (a10) (Comparative Example 6) or the coating liquid (a11) (Comparative Example 7).

The gas barrier multilayer structure precursor (X-13) and the gas barrier multilayer structure precursor (X-14) were each cut to a size of 20 cm×20 cm. The pieces were retort treated in the same manner as in Example 4 to afford a gas barrier multilayer structure (Z-13) (Comparative Example 6) and a gas barrier multilayer structure (Z-14) (Comparative Example 7).

The gas barrier multilayer structure precursors (X-13) and (X-14), and the gas barrier multilayer structures (Z-13) and (Z-14) were tested to evaluate the water resistance (1), the abuse resistance (2), the gas barrier properties (3) and the spectrum peak ratio (4) by the foregoing methods. The results are set forth in Tables 5 and 6.

Comparative Example 8

The coating liquid (ac-1) was applied with a bar coater on a biaxially stretched polyethylene terephthalate film (PET: LUMIRROR (registered trademark) P60 manufactured by TORAY INDUSTRIES INC., thickness: 12 μm, inside: corona treated) such that the dry thickness would be 0.2 μm. The coating was dried, and a support having an anchor coating layer (AC-1) was prepared.

On the anchor coating layer (AC-1) of the support, the coating liquid (a4) was applied with a bar coater such that the dry thickness thereof would be 0.5 μm. The coating was dried at 140° C. for 1 minute and aged at 50° C. for 2 days. Thus, a multilayer structure with a layer (A4) from the coating liquid (a4) was obtained which had a constitution [PET (12 μm)/AC-1 (0.2 μm)/layer (A4) (0.5 μm)].

The multilayer structure was soaked in an aqueous zinc acetate solution (10 wt % concentration) at 80° C. for 60 seconds.

The surface of the multilayer structure was washed with distilled water at 25° C. and was dried at 80° C. for 5 minutes. Thus, a gas barrier multilayer structure precursor (X-15) was prepared.

The gas barrier multilayer structure precursor (X-15) was cut to a size of 20 cm×20 cm. The piece was retort treated in the same manner as in Example 4 to afford a gas barrier multilayer structure (Z-15).

The gas barrier multilayer structure precursor (X-15) and the gas barrier multilayer structure (Z-15) were tested to evaluate the water resistance (1), the abuse resistance (2), the gas barrier properties (3) and the spectrum peak ratio (4) by the foregoing methods. The results are set forth in Tables 5 and 6.

Comparative Example 9

The coating liquid (ac-1) was applied with a bar coater on a biaxially stretched polyethylene terephthalate film (PET: LUMIRROR (registered trademark) P60 manufactured by TORAY INDUSTRIES INC., thickness: 12 μm, inside: corona treated) such that the dry thickness would be 0.2 μm. The coating was dried, and a support having an anchor coating layer (AC-1) was prepared.

On the anchor coating layer (AC-1) of the support, the coating liquid (a8) was applied with a bar coater such that the dry thickness thereof would be 0.5 μm. The coating was dried at 140° C. for 1 minute and aged at 50° C. for 2 days. Thus, a multilayer structure with a layer (A8) from the coating liquid (a8) was obtained which had a constitution [PET (12 μm)/AC-1 (0.2 μm)/layer (A8) (0.5 μm)].

The multilayer structure was soaked in an aqueous zinc acetate solution (10 wt % concentration) at 80° C. for 60 seconds.

The surface of the multilayer structure was washed with distilled water at 25° C. and was dried at 80° C. for 5 minutes. Thus, a gas barrier multilayer structure precursor (X-16) was prepared.

The gas barrier multilayer structure precursor (X-16) was cut to a size of 20 cm×20 cm. The piece was retort treated in the same manner as in Example 4 to afford a gas barrier multilayer structure (Z-16).

The gas barrier multilayer structure precursor (X-16) and the gas barrier multilayer structure (Z-16) were tested to evaluate the water resistance (1), the abuse resistance (2), the gas barrier properties (3) and the spectrum peak ratio (4) by the foregoing methods. The results are set forth in Tables 5 and 6.

TABLE 5

| | | Spectrum peak ratio | | |
|---|---|---|---|---|
| | Evaluation sample | Peak ratio | Evaluation sample | Peak ratio |
| Ex. 2 | Gas barrier multilayer structure precursor (X-6) | 0.0 | Gas barrier multilayer structure (Z-6) | 2.0 |
| Ex. 3 | Gas barrier multilayer structure precursor (X-7) | 0.9 | Gas barrier multilayer structure (Z-7) | 1.9 |
| Ex. 4 | Gas barrier multilayer structure precursor (X-8) | 0.6 | Gas barrier multilayer structure (Z-8) | 2.2 |
| Ex. 5 | Gas barrier multilayer structure precursor (X-9) | 0.4 | Gas barrier multilayer structure (Z-9) | 2.1 |
| Ex. 6 | Gas barrier multilayer structure precursor (X-10) | 0.4 | Gas barrier multilayer structure (Z-10) | 2.0 |
| Ex. 7 | Gas barrier multilayer structure precursor (X-11) | 0.3 | Gas barrier multilayer structure (Z-11) | 2.1 |
| Comp. Ex. 5 | Gas barrier multilayer structure precursor (X-12) | 0.0 | Gas barrier multilayer structure (Z-12) | 2.1 |
| Comp. Ex. 6 | Gas barrier multilayer structure precursor (X-13) | 0.3 | Gas barrier multilayer structure (Z-13) | 2.0 |
| Comp. Ex. 7 | Gas barrier multilayer structure precursor (X-14) | 0.2 | Gas barrier multilayer structure (Z-14) | 1.8 |
| Comp. Ex. 8 | Gas barrier multilayer structure precursor (X-15) | 1.9 | Gas barrier multilayer structure (Z-15) | 1.9 |
| Comp. Ex. 9 | Gas barrier multilayer structure precursor (X-16) | 2.1 | Gas barrier multilayer structure (Z-16) | 2.1 |

TABLE 6

| | Water resistance | | Abuse resistance | | Gas barrier properties | |
|---|---|---|---|---|---|---|
| | Evaluation sample | Evaluation | Evaluation sample | Oxygen permeability (II) | Evaluation sample | Oxygen permeability (I) |
| Ex. 2 | Laminate film (Y-6) | A | Laminate film (Y-6) | 10 | Gas barrier multilayer structure (Z-6) | 10 |
| Ex. 3 | Laminate film (Y-7) | A | Laminate film (Y-7) | 5 | Gas barrier multilayer structure (Z-7) | 5 |
| Ex. 4 | Laminate film (Y-8) | A | Laminate film (Y-8) | 3 | Gas barrier multilayer structure (Z-8) | 3 |
| Ex. 5 | Laminate film (Y-9) | A | Laminate film (Y-9) | 2 | Gas barrier multilayer structure (Z-9) | 2 |
| Ex. 6 | Laminate film (Y-10) | A | Laminate film (Y-10) | 4 | Gas barrier multilayer structure (Z-10) | 4 |
| Ex. 7 | Laminate film (Y-11) | A | Laminate film (Y-11) | 2 | Gas barrier multilayer structure (Z-11) | 2 |
| Comp. Ex. 5 | Laminate film (Y-12) | B | Laminate film (Y-12) | 2 | Gas barrier multilayer structure (Z-12) | 2 |
| Comp. Ex. 6 | Laminate film (Y-13) | B | Laminate film (Y-13) | 2 | Gas barrier multilayer structure (Z-13) | 2 |
| Comp. Ex. 7 | Laminate film (Y-14) | A | Laminate film (Y-14) | 90 | Gas barrier multilayer structure (Z-14) | 90 |
| Comp. Ex. 8 | Laminate film (Y-15) | A | Laminate film (Y-15) | 56 | Gas barrier multilayer structure (Z-15) | 6 |
| Comp. Ex. 9 | Laminate film (Y-16) | A | Laminate film (Y-16) | 71 | Gas barrier multilayer structure (Z-16) | 8 |

Oxygen permeability (I) and (II) were measured at 20° C. and 80% RH, unit [$cm^3$ (STP)/$m^2$ · day · MPa].

Examples and Comparative Examples show that the gas barrier multilayer structures achieve good gas barrier properties and water resistance (resistance to delamination) by having the layer (A) that is prepared with a polycarboxylic acid:silane coupling agent weight ratio in the range of 99.5:0.5 to 80.0:20.0. Insufficient amounts of the silane coupling agent can cause poor adhesion between the support and the gas barrier layer when the gas barrier multilayer structure precursor is treated to give the gas barrier multilayer structure, tending to result in low productivity of the gas barrier multilayer structures. Excessively large amounts of the silane coupling agent can lead to insufficient gas barrier properties.

The invention claimed is:

1. A gas barrier multilayer structure precursor comprising a support and a gas barrier layer precursor formed on the support, the gas barrier layer precursor comprising a layer (A) and a layer (B), the layer (A) comprising a polycarboxylic acid polymer and at least one silicon-containing compound (i) selected from the group consisting of silane coupling agents represented by Formula (1) below, hydrolysates thereof and condensates of these compounds, the weight ratio of the polycarboxylic acid polymer and the silicon-containing compound(s) (i) in the layer (A) (the weight of the silicon compounds (i) other than the silane coupling agents is in terms of silane coupling agents) being in the range of 99.5:0.5 to 80.0:20.0, the layer (B) comprising a polyvalent metal compound, the layer (A) isolated from the support and the layer (B) and analyzed by a transmission method showing an infrared absorption spectrum in which the maximum peak height (α) in the range of 1490 to 1659 cm$^{-1}$ and the maximum peak height (β) in the range of 1660 to 1750 cm$^{-1}$ have a ratio (α/β) of less than 1;

$$Si(OR)_3Z \qquad (1)$$

wherein R is a C1-6 alkyl group, Z is an organic group containing a glycidyloxy or amino group, and a plurality of R may be the same or different from one another.

2. A gas barrier multilayer structure precursor comprising a support and a gas barrier layer precursor formed on the support, the gas barrier layer precursor comprising a layer (A) and a layer (B) that are obtained by applying a coating liquid (a) on the support and drying the coating to form the layer (A) and thereafter applying a coating liquid (b) and drying the coating to form the layer (B), the coating liquid (a) comprising a polycarboxylic acid polymer and at least one silicon-containing compound (i) selected from the group consisting of silane coupling agents represented by Formula (1) below, hydrolysates thereof and condensates of these compounds, the coating liquid (b) comprising a polyvalent metal compound, the weight ratio of the polycarboxylic acid polymer and the silicon-containing compound(s)(i) in the coating liquid (a)(the weight of the silicon compounds (i) other than the silane coupling agents is in terms of silane coupling agents) being in the range of 99.5:0.5 to 80.0:20.0, the layer (A) isolated from the support and the layer (B) and analyzed by a transmission method showing an infrared absorption spectrum in which the maximum peak height (α) in the range of 1490 to 1659 cm$^{-1}$ and the maximum peak height (β) in the range of 1660 to 1750 cm$^{-1}$ have a ratio (α/β) of less than 1;

$$Si(OR)_3Z \qquad (1)$$

wherein R is a C1-6 alkyl group, Z is an organic group containing a glycidyloxy or amino group, and a plurality of R may be the same or different from one another.

3. A gas barrier multilayer structure precursor comprising a support and a gas barrier layer precursor formed on the support, the gas barrier layer precursor comprising a layer (A) and a layer (B) that are obtained by applying a coating liquid (b) on the support and drying the coating to form the layer (B) and thereafter applying a coating liquid (a) and drying the coating to form the layer (A), the coating liquid (b) comprising a polyvalent metal compound, the coating liquid (a) comprising a polycarboxylic acid polymer and at least one silicon-containing compound (i) selected from the group consisting of silane coupling agents represented by Formula (1) below, hydrolysates thereof and condensates of these compounds, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0, the layer (A) isolated from the support and the layer (B) and analyzed by a transmission method showing an infrared absorption spectrum in which the maximum peak height (α) in the range of 1490 to 1659 cm$^{-1}$ and the maximum peak height (β)in the range of 1660 to 1750 cm$^{-1}$ have a ratio (α/β) of less than 1;

$$Si(OR)_3Z \qquad (1)$$

wherein R is a C1-6 alkyl group, Z is an organic group containing a glycidyloxy or amino group, and a plurality of R may be the same or different from one another.

4. A gas barrier multilayer structure that is obtained by subjecting the gas barrier multilayer structure precursor of any one of claims 1 to 3 to at least one treatment selected from the group consisting of retort treatment, boil treatment and humidity conditioning treatment and comprises a support and a gas barrier layer formed on the support, the gas barrier layer comprising a layer (A') and a layer (B'), the layer (A') comprising a polycarboxylic acid polymer that is ionically crosslinked via a polyvalent metal ion and at least one silicon-containing compound (i) selected from the group consisting of silane coupling agents represented by Formula (1) below, hydrolysates thereof and condensates of these compounds, the layer (B') comprising a polyvalent metal compound, the layer (A') isolated from the support and the layer (B') and analyzed by a transmission method showing an infrared absorption spectrum in which the maximum peak height (α) in the range of 1490 to 1659 cm$^{-1}$ and the maximum peak height (β) in the range of 1660 to 1750 cm$^{-1}$ have a ratio (α/β) of 1 or more;

$$Si(OR)_3Z \qquad (1)$$

wherein R is a C1-6 alkyl group, Z is an organic group containing a glycidyloxy or amino group, and a plurality of R may be the same or different from one another.

5. A process for producing gas barrier multilayer structure precursors, comprising a step (a step 1) of applying a coating liquid (a) on a support and drying the coating to form a layer (A), the coating liquid (a) comprising a polycarboxylic acid polymer and at least one silicon-containing compound (i) selected from the group consisting of silane coupling agents represented by Formula (1) below, hydrolysates thereof and condensates of these compounds, and a step (a step 2) of applying a coating liquid (b) and drying the coating to form a layer (B), the coating liquid (b) comprising a polyvalent metal compound, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0;

$$Si(OR)_3Z \qquad (1)$$

wherein R is a C1-6 alkyl group, Z is an organic group containing a glycidyloxy or amino group, and a plurality of R may be the same or different from one another.

6. A process for producing gas barrier multilayer structure precursors, comprising a step (a step I) of applying a coating liquid (b) on a support and drying the coating to form a layer (B), the coating liquid (b) comprising a polyvalent metal compound, and a step (a step II) of applying a coating liquid (a) and drying the coating to form a layer (A), the coating liquid (a) comprising a polycarboxylic acid polymer and at least one silicon-containing compound (i) selected from the group consisting of silane coupling agents represented by Formula (1) below, hydrolysates thereof and condensates of these compounds, the weight ratio of the polycarboxylic acid polymer and the silicon-containing compound(s) (i) in the coating liquid (a) (the weight of the silicon compounds (i) other than the silane coupling agents is in terms of silane coupling agents) being in the range of 99.5:0.5 to 80.0:20.0;

$$Si(OR)_3Z \qquad (1)$$

wherein R is a C1-6 alkyl group, Z is an organic group containing a glycidyloxy or amino group, and a plurality of R may be the same or different from one another.

7. A process for producing gas barrier multilayer structures, comprising subjecting the gas barrier multilayer structure precursor of any one of claims 1 to 3 to at least one treatment selected from the group consisting of retort treatment, boil treatment and humidity conditioning treatment.

* * * * *

UNITED STATES PATENT AND TRADEMARK OFFICE
CERTIFICATE OF CORRECTION

PATENT NO. : 8,383,245 B2
APPLICATION NO. : 12/451718
DATED : February 26, 2013
INVENTOR(S) : Yusaku Inaba et al.

Page 1 of 1

It is certified that error appears in the above-identified patent and that said Letters Patent is hereby corrected as shown below:

Title Page, Item (54) and in the specification, Column 1, Line 2, Title, delete "PRECURSOR,GAS" and insert -- PRECURSOR, GAS --

In the Claims:

Column 39, Line 56, Claim 2, delete "compound(s)(i)" and insert -- compound(s) (i) --

Column 39, Line 57, Claim 2, delete "(a)(the" and insert -- (a) (the --

Column 40, Line 27, Claim 3, delete "(β)in" and insert -- (β) in --

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO.       : 8,383,245 B2  
APPLICATION NO. : 12/451718  
DATED            : February 26, 2013  
INVENTOR(S)      : Inaba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this  
First Day of September, 2015

Michelle K. Lee  
*Director of the United States Patent and Trademark Office*